US007954329B2

(12) United States Patent
Grossi

(10) Patent No.: US 7,954,329 B2
(45) Date of Patent: Jun. 7, 2011

(54) STATICALLY-OPERATING EJECTOR RAMJET

(75) Inventor: Fabio G. Grossi, Grapevine, TX (US)

(73) Assignee: Grossi Aerospace, Inc., Grapevine, TX (US)

( * ) Notice: Subject to any disclaimer, the term of this patent is extended or adjusted under 35 U.S.C. 154(b) by 791 days.

(21) Appl. No.: 12/024,573

(22) Filed: Feb. 1, 2008

(65) Prior Publication Data

US 2009/0158744 A1    Jun. 25, 2009

Related U.S. Application Data

(60) Provisional application No. 61/016,289, filed on Dec. 21, 2007.

(51) Int. Cl.
*F02K 7/08* (2006.01)
*F02K 7/10* (2006.01)
(52) U.S. Cl. ............................................ 60/767; 60/768
(58) Field of Classification Search .................. 60/767, 60/768
See application file for complete search history.

(56) References Cited

U.S. PATENT DOCUMENTS

| 3,093,962 | A | 6/1963 | Gluhareff |
| 4,332,529 | A | 6/1982 | Alperin |
| 4,644,746 | A | 2/1987 | Hartman |
| 4,645,140 | A | 2/1987 | Bevilaqua et al. |
| 4,815,942 | A | 3/1989 | Alperin et al. |
| 5,129,227 | A | 7/1992 | Klees et al. |
| 5,205,119 | A | 4/1993 | Bulman |
| 5,327,721 | A | 7/1994 | Bulman |
| 5,946,904 | A | 9/1999 | Boehnlein et al. |
| 6,786,040 | B2 | 9/2004 | Boehnlein et al. |
| 2003/0145578 | A1 | 8/2003 | Oishi |
| 2003/0154720 | A1 | 8/2003 | Boehnlein et al. |

FOREIGN PATENT DOCUMENTS

GB        2404952 A        2/2005

OTHER PUBLICATIONS

Abdel-Fattah, et al, "Duct Resonance and Its Effects on the Performance of High-Pressure Ratio Axisymmetric Ejectors," AIAA Journal, vol. 26, No. 7, Jul. 1988, pp. 791-798, American Institute of Aeronautics and Astronautics, Inc., Washington, DC 20024 USA.
Bendot, et al, "Low Cost Hypermixing Ejector Ramjet Program," US DoD AD No. ADA016430 Corporate Author: Marquardt Co, Van Nuys, CA USA, Report Date: Jun. 1, 1975.

(Continued)

*Primary Examiner* — Michael Cuff
*Assistant Examiner* — Craig Kim
(74) *Attorney, Agent, or Firm* — Christopher P. O'Hagan; Carstens & Cahoon LLP

(57) ABSTRACT

The present invention provides a statically starting and operating ramjet engine system. The system includes a pumping ejector coupled to a ramjet engine upstream of the ramjet inlet. A subsonic converging nozzle is placed in fluid communication between the pumping ejector and ramjet inlet. The pumping ejector ejects a primary fluid into the ramjet inlet to entrain a secondary fluid and create a mixed flow with sufficient momentum and internal energy to achieve characteristic speed. The converging nozzle provides a characteristic cross section necessary for the mixed flow to achieve characteristic speed as it moves through the nozzle, thereby producing a standing shock wave at the point of maximum convergence of the nozzle and creating sonic conditions at the inlet of the ramjet engine.

15 Claims, 20 Drawing Sheets

OTHER PUBLICATIONS

Der, Joe, "Improved Methods of Characterizing Ejector Pumping Performance," Journal of Propulsion and Power, vol. 7, No. 3, May-Jun. 1991, pp. 412-419, American Institute of Aeronautics and Astronautics, Inc., Washington, DC 20024 USA.

Fry, Ronald S., "A Century of Ramjet Propulsion Technology Evolution," Journal of Propulsion and Power, vol. 20, No. 1, Jan.-Feb. 2004, pp. 27-58, American Institute of Aeronautics and Astronautics, Inc., Washington, DC 20024 USA.

Gluhareff, Eugene M., G8-2 Technical Manual, published by EMG Engineering Co., 18518 So. Broadway, Gardena, CA 90248 USA, circa 1978.

Keenan, et al. "A Simple Air Ejector," Journal of Applied Mechanics, Jun. 1942, pp. A-75 thru A-81.

Keenan, et al, "An Investigation of Ejector Design by Analysis and Experiment," Journal of Applied Mechanics, Sep. 1950, pp. 299-309.

Schmitt, H., "Diversity of Jet Pumps and Ejector Techniques," Paper A4, pp. A4-35 thru A4-49, proceedings of the 2nd Symposium on Jet Pumps & Ejectors and Gas Lift Techniques, Mar. 24th-26th 1975, held at Churchill College, Cambridge England, published by BHRA Fluid Engineering in Cranfield, Bedford, England, circa 1975.

Waltrup, et al, "History of U.S. Navy Ramjet, Scramjet, and Mixed-Cycle Propulsion Development," Journal of Propulsion and Power, vol. 18, No. 1, Jan.-Feb. 2002, pp. 14-27, American Institute of Aeronautics and Astronautics, Inc., Washington, DC 20024 USA.

Zucrow, Maurice Joseph, Aircraft and Missile Propulsion, vol. II, The Gas Turbine Power Plant, the Turboprop, Turbojet, Ramjet, and Rocket Engines. New York, John Wiley &Sons, Inc., 1958.

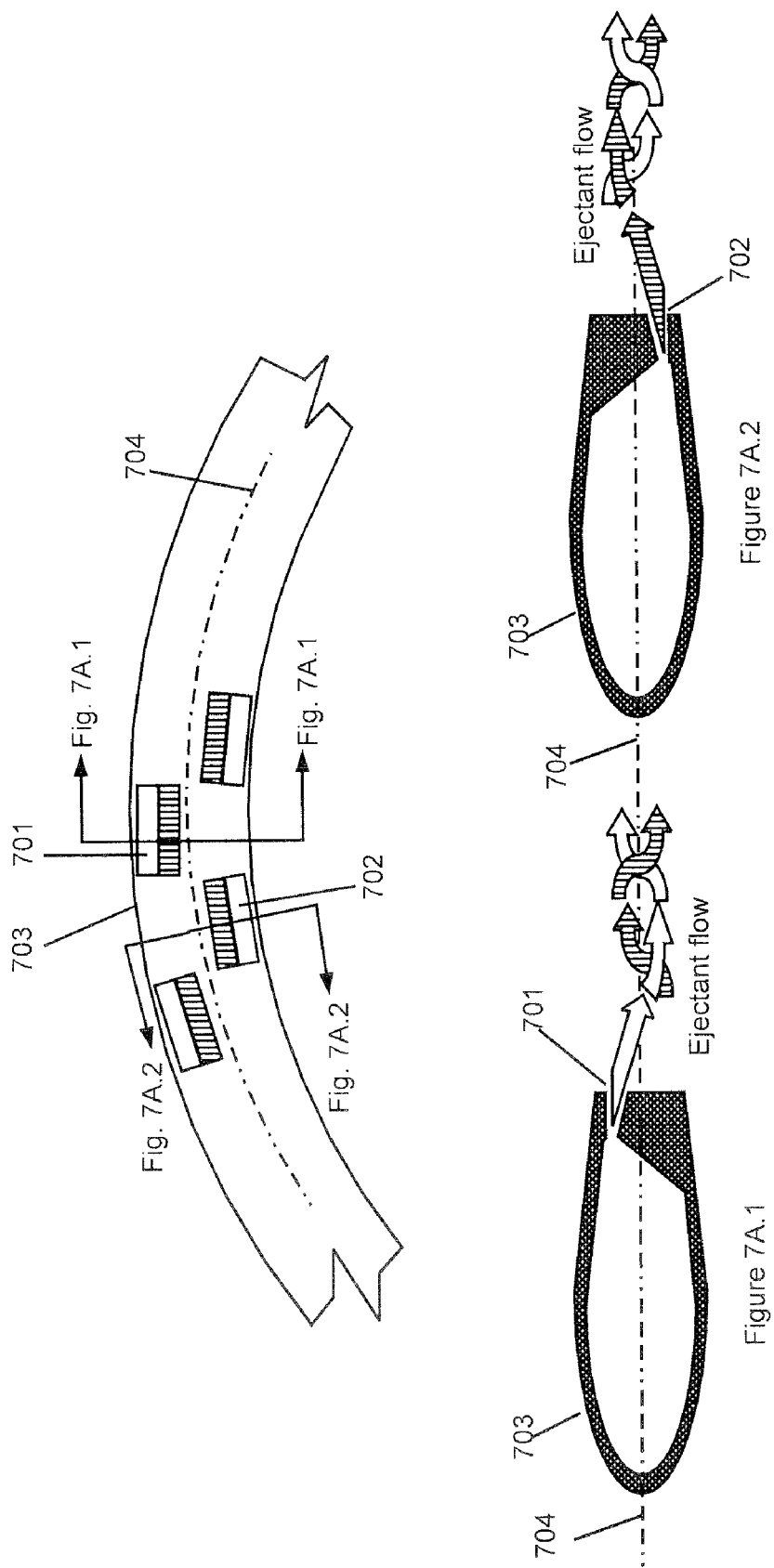

STATICALLY-OPERATING EJECTOR RAMJET

CROSS-REFERENCE TO RELATED APPLICATIONS

This application claims the benefit of and priority to U.S. Provisional Patent Application 61/016,289 filed Dec. 21, 2007, the technical disclosures of which are hereby incorporated herein by reference.

This application is also related to co-pending applications Ser. No. 12/024,646 filed Feb. 1, 2008 entitled "Pumping Ejector," Ser. No. 12/024,698 filed Feb. 1, 2008 entitled "Hypermixing Fluid Ejector," and Ser. No. 12/024,749 filed Feb. 1, 2008 entitled "Ramjet Superheater."

TECHNICAL FIELD

The present invention relates generally to aerospace propulsion and more specifically to a design for a ramjet that is capable of static start and operation.

BACKGROUND OF THE INVENTION

A ramjet is a type of air breathing propulsive engine that uses fixed components to compress and accelerate intake air by ram effect. It is also affectionately known as the flying stovepipe.

FIG. 1 shows the basic elements of a ramjet power cycle and flowpath in accordance with the prior art. Conventional ramjet theory evolved during the early twentieth century and has promised many benefits over other propulsion theories. Conventional ramjets are described by the Brayton power cycle (see W. H. Heiser and D. T. Pratt. et al, *Hypersonic Airbreathing Propulsion*, American Institute of Aeronautics and Astronautics, Inc., Washington, D.C. 20024 USA, 1994, the contents of which are hereby incorporated by reference). The ideal open Brayton cycle describes the thermodynamic power cycle for the ideal ramjet engine.

In its simplest configuration, the open cycle has three phases. Initially air is taken from the environment and is isentropically compressed, meaning the compression is both adiabatic and reversible; no energy is added to the flow, and no energy losses occur due to friction or dissipative effects. Heat is then added to increase the temperature and energy of the air isobarically, and the air is expanded isentropically into the environment to the initial pressure of the air. The energy released during final expansion is partially consumed by the initial compression. The net work/power done by the cycle on the environment is positive when the isentropic compression results in an internal air total pressure greater than the external air total pressure.

According to Zucrow, Waltrup, and Fry, the first workable ramjet concept was published early in the twentieth century. (see Zucrow, Maurice Joseph, *Aircraft and Missile Propulsion, Volume II, The Gas Turbine Power Plant, the Turboprop, Turbojet, Ramjet, and Rocket Engines*. New York, John Wiley & Sons, Inc., 1958; Waltrup, et al, "History of U.S. Navy Ramjet, Scramjet, and Mixed-Cycle Propulsion Development," *Journal of Propulsion and Power*, Vol. 18, No. 1, January-February 2002, pp. 14-27, American Institute of Aeronautics and Astronautics, Inc., Washington, D.C. 20024 USA; and Fry, Ronald S., "A Century of Ramjet Propulsion Technology Evolution," *Journal of Propulsion and Power*, Vol. 20, No. 1, January-February 2004, pp. 27-58, American Institute of Aeronautics and Astronautics, Inc., Washington, D.C. 20024 USA, the contents of which are hereby incorporated by reference.)

In 1928 a German patent (#554,906) was issued to Albert Fono for a ramjet optimized for supersonic flight. Referring back to FIG. 1, the simplest configuration was a duct which included, in order of flow, a diverging inlet/diffuser 101, a constant-area subsonic combustor 102, and a converging-diverging nozzle 103.

FIG. 2 is a block diagram representation of the Fono engine. This configuration reflects the ideal open Brayton cycle's phases respectively. Air enters the diverging-wall subsonic diffuser 201 and passes into the constant-area mixer 202 where it is mixed with the fuel supplied from a fluid reservoir 203. The air/fuel combination is then combusted by a flameholder/igniter in the combustion chamber 204. The combustion products move through a converging-wall subsonic nozzle 205 and then are released into the atmosphere through a diverging-wall supersonic nozzle 206.

For a ramjet engine based upon the ideal open Brayton cycle, an internal air total pressure ratio above unity causes ramjet power. The term "ramjet" comes from the creation of power from the ramming of air into the engine inlet sufficiently to cause internal air total pressure ratio above unity in the combustor and then expelling that higher-pressure air as a jet with propulsive force. Maximum internal air total pressure ratio is achieved when the ramjet's inlet has a sonic condition. However, the Fono ramjet has no direct means for completing the Brayton cycle and creating sonic inlet conditions.

The open Brayton cycle is complete only when the energy released during the final expansion phase is consumed in part to power the initial compression. The Fono ramjet accomplishes the energy transfer from the final expansion to the initial compression indirectly by the synergy of the propulsive force causing the ramming of air into the inlet during sonic forward flight. This indirect energy transfer describes the ramjet conundrum: for the Fono ramjet to be generating thrust it must be moving forward and to move forward it must be generating thrust.

The Fono ramjet conundrum prevents this propulsion concept from operating statically (unmoving) which is an obviously severe limitation for reducing to practice. All known working examples of ramjets are accelerated to critical operating speed (typically Mach 1.0) by an ancillary propulsion engine before generating power. Typically, this is achieved using other propulsion methods incorporated into the body of the aircraft or engine such as solid or liquid rockets or turbojet engines. The simplicity of the design and construction of the Fono ramjet is violated by the need for an ancillary propulsion engine.

Therefore, it would be desirable to have a ramjet design that is capable of statically starting and operating without the need for an ancillary propulsion system.

SUMMARY OF THE INVENTION

The present invention provides a statically starting and operating ramjet engine system. The system includes a pumping ejector coupled to a ramjet engine upstream of the ramjet inlet. A subsonic converging nozzle is placed in fluid communication between the pumping ejector and ramjet inlet. The pumping ejector ejects a primary fluid into the ramjet inlet to entrain a secondary fluid and create a mixed flow with sufficient momentum and internal energy to achieve characteristic speed. The converging nozzle provides a characteristic cross section necessary for the mixed flow to achieve characteristic speed as it moves through the nozzle, thereby producing a standing shock wave at the point of maximum convergence of the nozzle and creating sonic conditions at the inlet of the ramjet engine.

The ramjet engine system can be either mono-propellant or bi-propellant in design. In the mono-propellant embodiment, the primary fluid includes a reactive propellant that enters the ramjet engine at the inlet via the pumping ejector. The primary fluid can either consist of a purely reactive propellant or a reactive propellant diluter with an inert propellant.

The bi-propellant embodiment of the present invention ejects an inert propellant through the pumping ejector and a second, reactive propellant enters the ramjet engine via a mixing duct located between the ramjet inlet and combustion chamber.

The pumping ejector of the present invention also incorporates a hypermixing nozzle that comprises alternating upper and lower abutting orifices that are geometrically inclined to produce spray cones convergent relative to the longitudinal axis of the ejector to produce convergent helical hypermixing of the primary and secondary fluids.

In a preferred embodiment, the ramjet engine system further comprises a regenerative superheater that transfers thermal energy from the ramjet engine combustion chamber to a reservoir containing the primary fluid. The superheated primary fluid is redirected upstream into the pumping ejector. In one embodiment, the superheater is located inside the ramjet combustion chamber. In an alternate embodiment, the superheater is located outside the combustion chamber.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 7A is a cross sectional view of the primary fluid nozzle in accordance with the preferred embodiment of the present invention;

DETAILED DESCRIPTION

The most obvious benefit of ramjet theory is the simplicity of design and construction. However, there are no ramjet engines made available to the marketplace for general application. The few working examples are limited to military applications for expendable weaponry. The limiting issue for ramjet application is the ramjet conundrum.

The present invention solves the ramjet conundrum by artificially creating sonic conditions at the ramjet inlet by means of a pumping ejector used to force air through the subsonic diffuser at the front of the ramjet.

The term "ejector ramjet" within the art of propulsion includes a broad array of configurations that comprise any combination of an ejector with a ramjet. The ejector can be mated to the ramjet in any location and be either integral or accessory and have either reactive or inert fluids. The ramjet can be a classical Fono type or supersonic-combustion type. Components are combined to solve specific propulsion problems. Therefore, the term "ejector ramjet" does not have the force of specificity and leaves all ejector-ramjet configurations wanting in this designation. For purposes of the present discussion, the relevant ejector ramjet prior art includes any Fono-type ramjet with an ejector mated upstream of the ramjet diffuser. Furthermore, the ejector primary fluid is a gas.

Much of the relevant prior art for ejector ramjets covers configurations with ejectors upstream of the ramjet diffuser for the purpose of solving the ramjet high-speed mixing problem rather than the ramjet conundrum regarding sonic conditions at the ramjet inlet. In the advancing operational experience and theoretical understanding through the generations of Fono's ramjet design, a new problem came to light: high-speed fuel-air mixing became a limiting factor of operational use. Increases in flight speed cause an increased speed of internal flow, and with a fixed internal flow length (i.e. length of the ramjet engine) there is a limited transit time during which fuel and air can be mixed, ignited, and completely combusted.

Conventional ramjets operating at the upper extreme of speed have insufficient internal length to completely mix and burn their fuel; the essence of the high-speed mixing problem. Solving the ramjet high-speed mixing problem requires the use of only a mixing blower ejector and not a pumping ejector (distinguished below). However, a mixing blower ejector is incapable of solving the ramjet conundrum.

Figure 1:
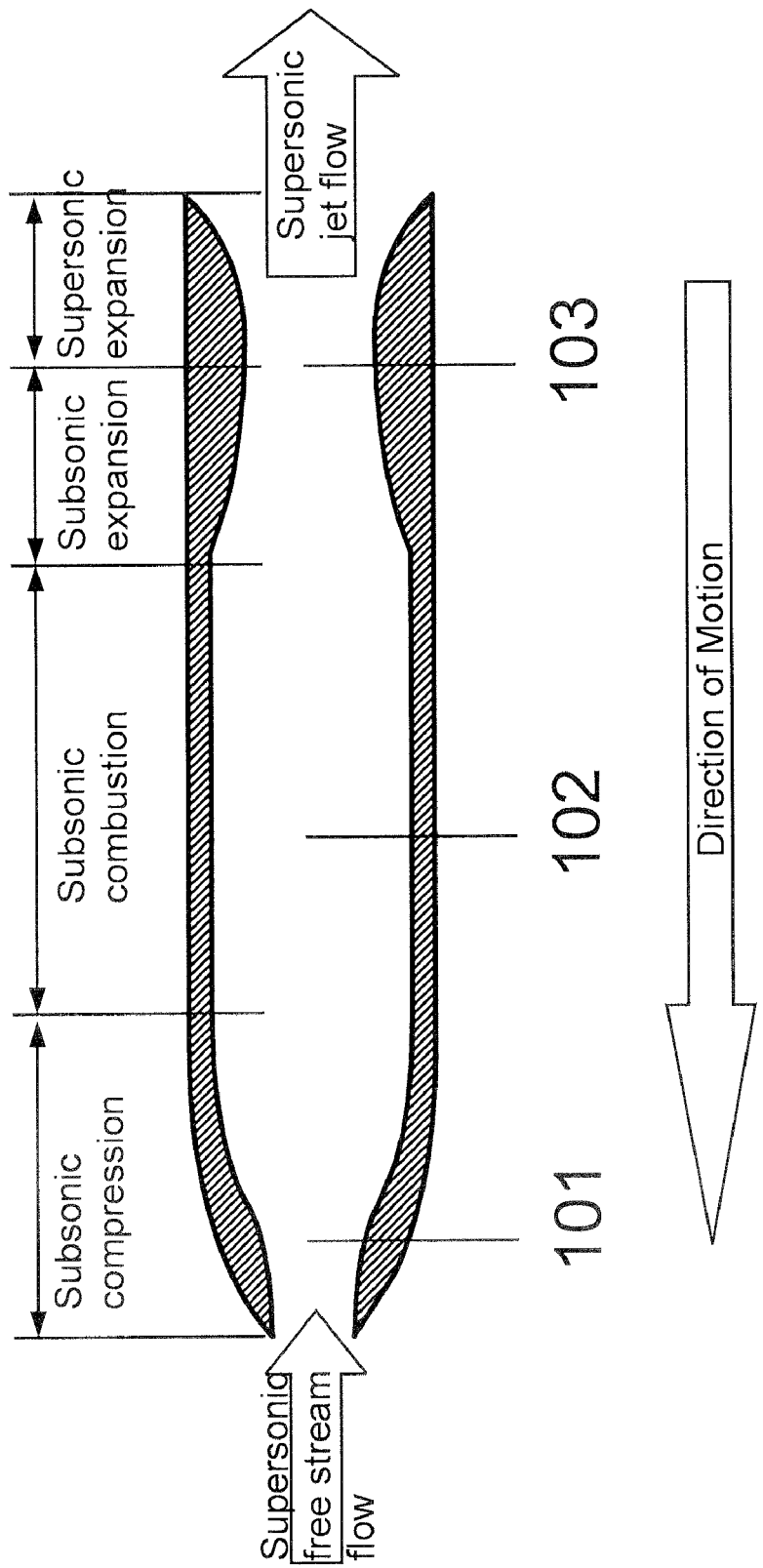
FIG. 1 shows in side view the basic elements of a ramjet power cycle and flowpath in accordance with the prior art.
Figure 2:
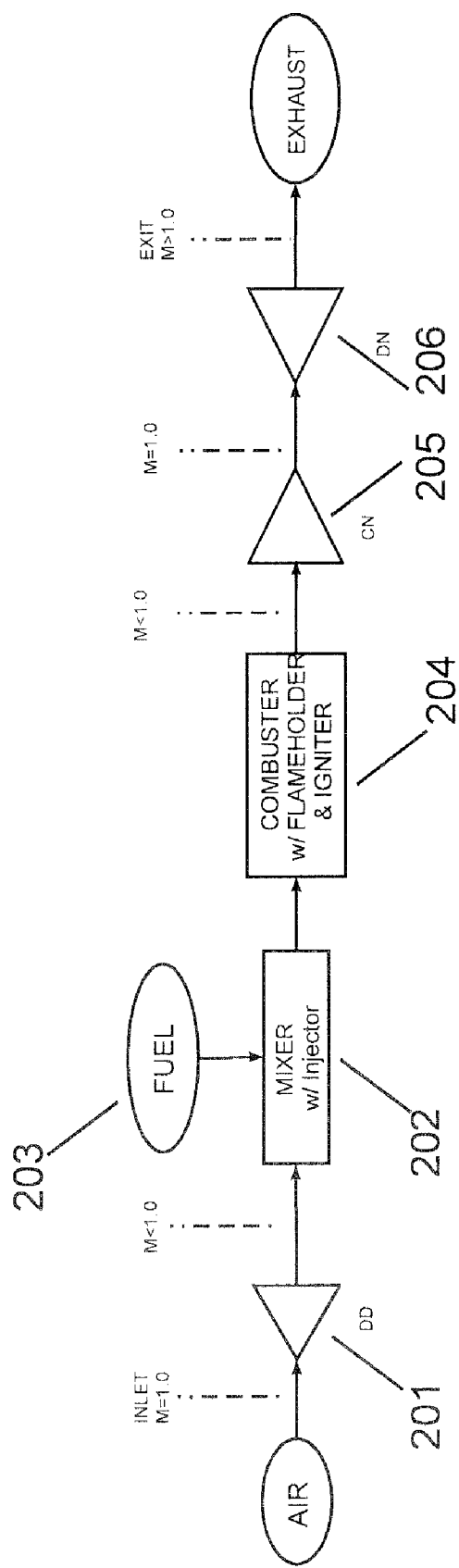
FIG. 2 is a block diagram representation of the Fono engine.
Figure 3:
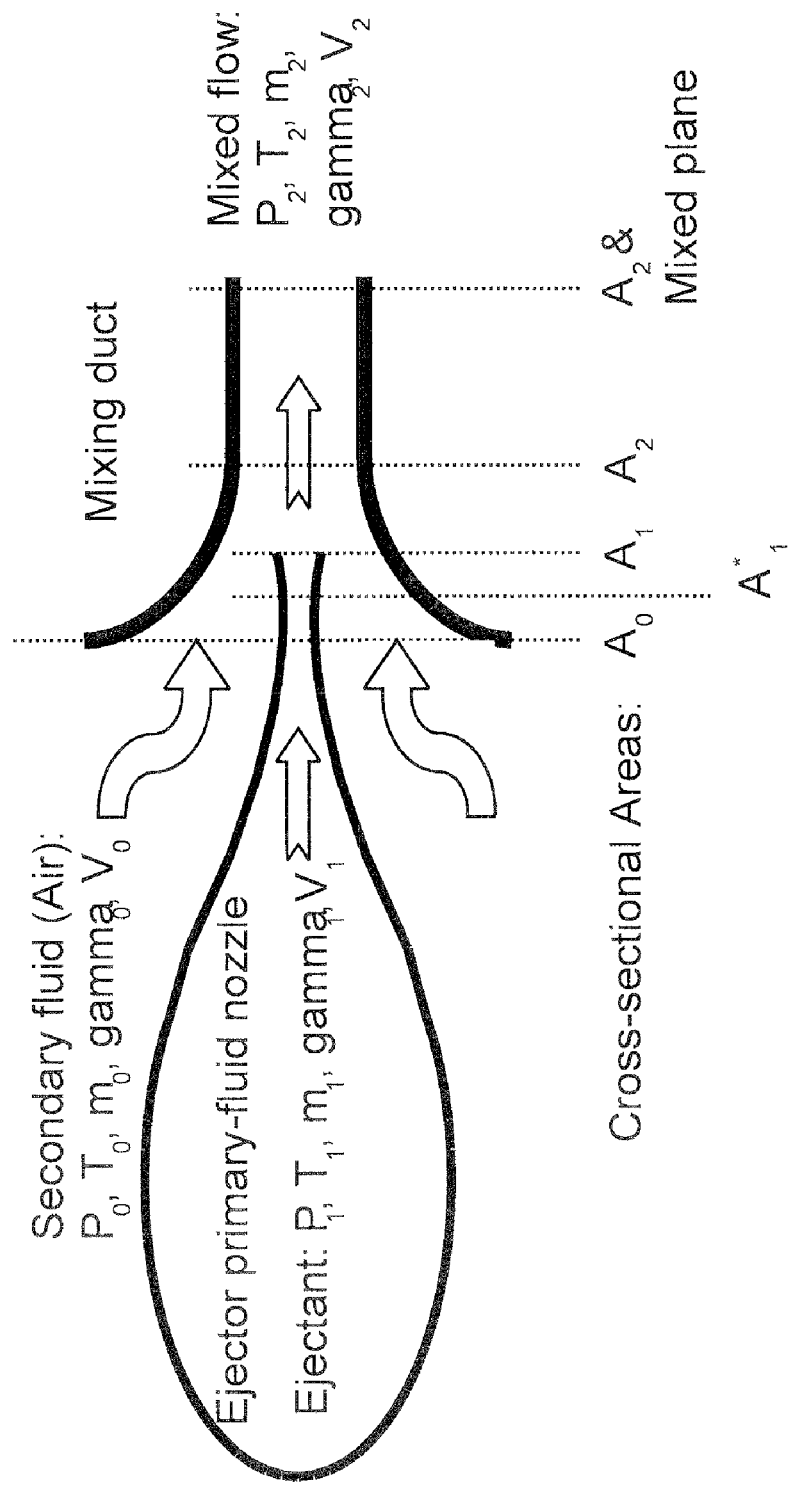
FIG. 3 illustrates an ejector in side view in accordance with the prior art.

FIG. 3 illustrates a cross section view of an ejector in accordance with the prior art. An ejector is a kinetic driver of fluids. A first generation ejector as described by Keenan is a nozzle directing a fluid jet (primary) into the inlet of a larger duct. (see Keenan, et al., "A Simple Air Ejector," *Journal of Applied Mechanics*, June 1942, pp. A-75 thru A-81, the contents of which are hereby incorporated by reference.) The dynamic action of the fluid jet entrains surrounding fluid (secondary) into the duct via momentum transfer. The mixed mass flow of an ejector is the sum of the primary and secondary mass flows:

$$\dot{m}_2 = \dot{m}_0 + \dot{m}_1 \quad \text{Eq. 1}$$

An ideal ejector with ideal and equivalent fluids conserves the primary flow's momentum in the mixed flow:

$$\dot{m}_1 \cdot V_1 = \dot{m}_2 \cdot V_2 \quad \text{Eq. 2}$$

The real physical mechanisms of the momentum transfer are varied and not completely understood. The real mechanisms include, but are not limited to, viscous fluids in shear and acoustic harmonics. An ejector can function as either a low-pressure mixing blower or as a high-pressure pump.

Figure 4:
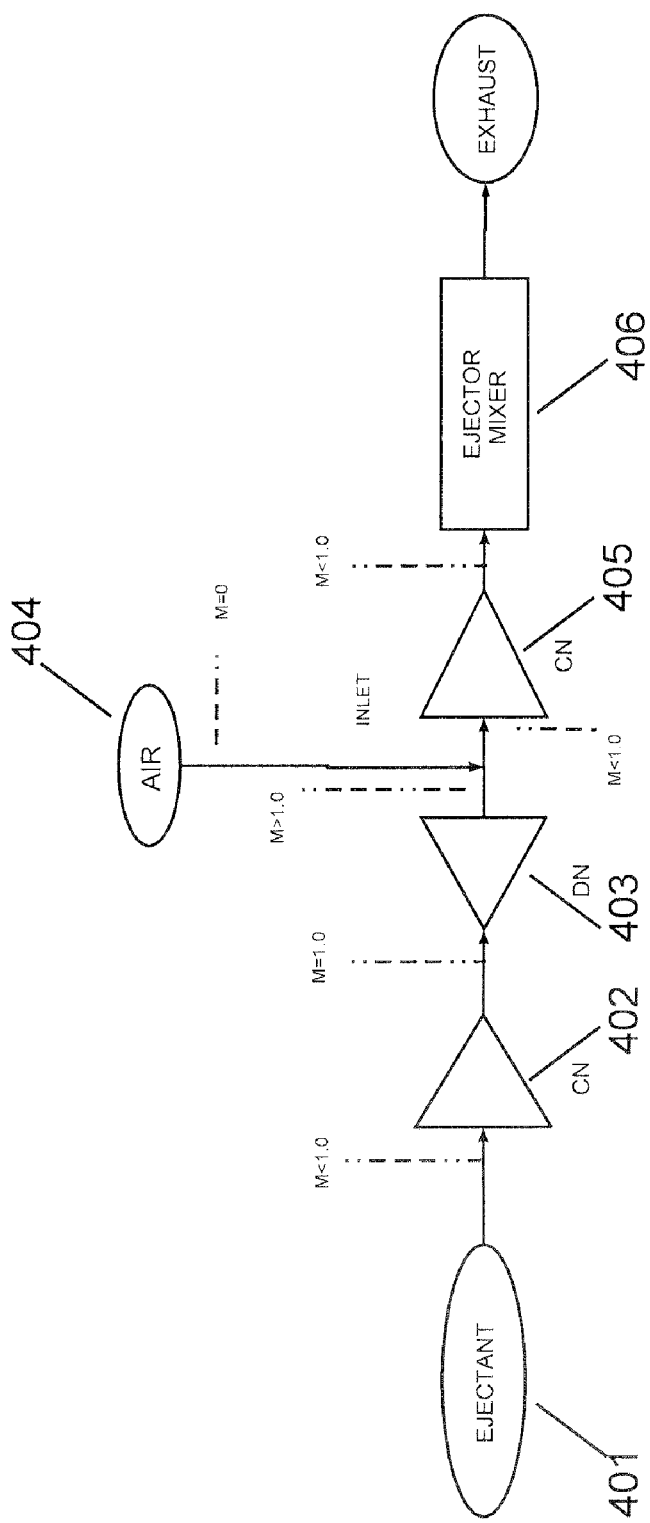
FIG. 4 is a block diagram representation of a mixing ejector in accordance with the prior art.

FIG. 4 shows a mixing ejector in accordance with the prior art. Ejectant moves from a gaseous reservoir 401 through a converging-wall subsonic nozzle 402 and then through a diverging-wall supersonic nozzle 403. Air 404 is than added to the ejectant, and both pass through another converging-wall subsonic nozzle 405 to the ejector mixer 406.

An ejector's primary-fluid nozzle geometry must be carefully selected and designed to achieve the desired function. Given a gas with unchanging initial state properties, the selection of nozzle geometry can cause thermodynamic conditions at the point of exit ranging between two useful extremes. The first useful extreme is sonic speed ($V_1$=1.0Mach) with exit static pressure significantly higher than secondary fluid pressure ($P_1 \gg P_0$). The second useful extreme is supersonic speed ($V_1 \gg 1.0$Mach) with exit static pressure equal to secondary fluid pressure (P at $A_1 = P_0$). The former condition is termed under-expanded and the latter is termed fully-expanded (see Heiser and Pratt §7.4).

An ejector's performance can be measured by various ratios, and for this discussion the Mass Augmentation Ratio (MAR) is key. The MAR is the ratio of the induced mass flow rate of the secondary fluid to the primary fluid:

$$MAR = \frac{\dot{m}_0}{\dot{m}_1} \quad \text{Eq. 3}$$

Ejectors can be classified as either mixers or pumps. A useful mixing ejector for propulsion would maximize the downstream MAR (MAR$\gg$0). This goes back to the issue of high-speed fuel-air mixing described above. In contrast, a pump ejector for propulsion would maximize the downstream "total pressure" while also achieving a minimum useful MAR (MAR>0).

Figure 5:
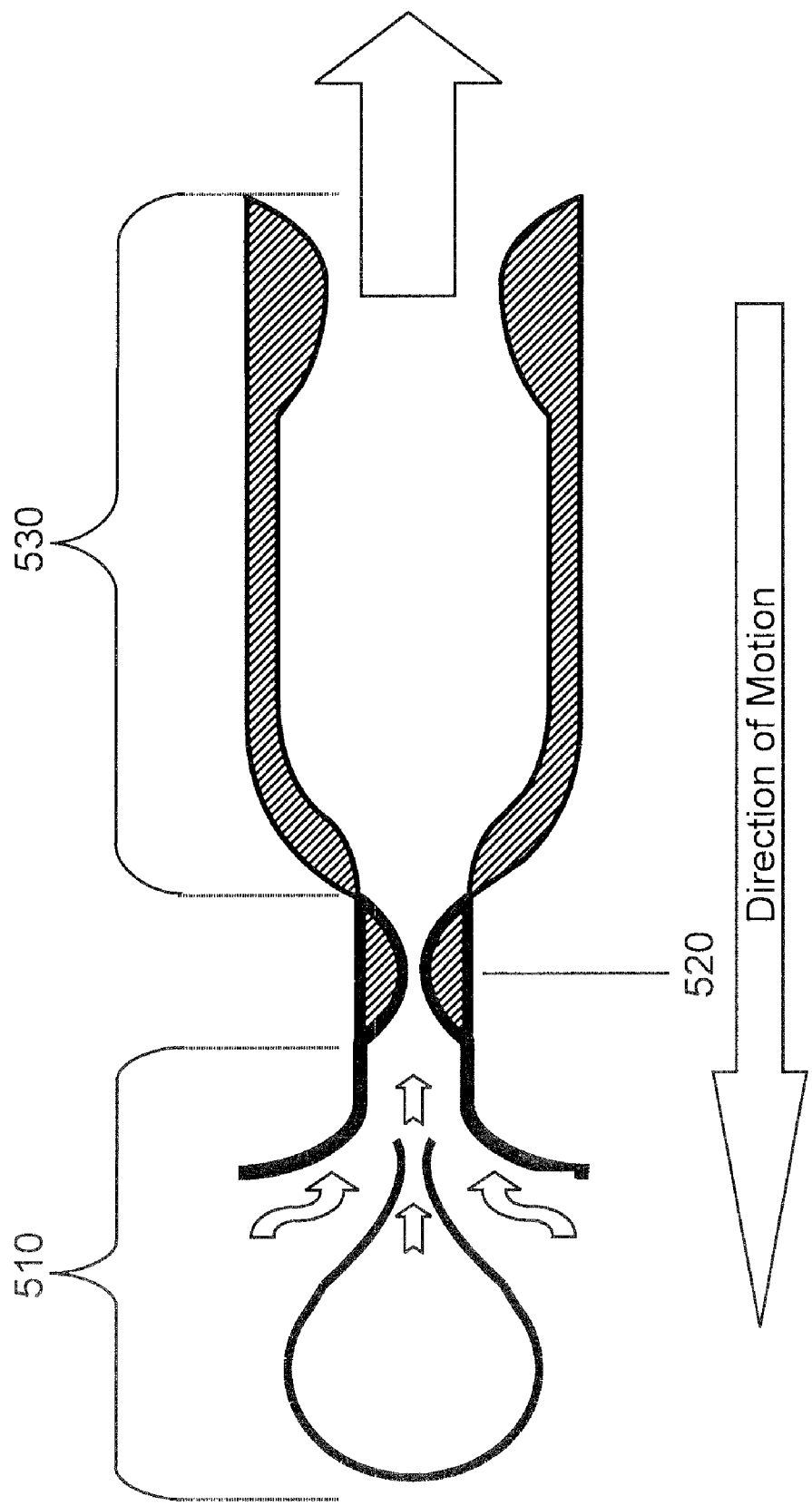
FIG. 5 is a cross section view of a pumping ejector coupled to a ramjet engine in accordance with the present invention.

FIG. 5 is a cross section view of a pumping ejector coupled to a ramjet engine in accordance with the present invention. The pumping ejector 510 directs a mixed flow into a subsonic converging nozzle 520 which exhausts into a Fono-type ramjet 530.

An ejector operating as a pump can be distinguished by ideal-gas thermodynamics and especially the "characteristic speed." The characteristic speed is that fluid flow rate in a conduit which is sonic and can be exceeded only through the addition of heat. Flow in a conduit at its characteristic speed is termed "choked" (see Oates, Gordon C., *Aerothermodynamics of Gas Turbine and Rocket Propulsion*, Revised and Enlarged, American Institute of Aeronautics and Astronautics, Inc., Washington, D.C. 20024 USA, 1988, specifically eq. 2.104).

The cross-sectional area of the choked conduit is termed the characteristic area. The thermodynamic total state variables in the choked condition are also qualified as "characteristic" and are designated by a superscript asterix on formulae parameters. In the context of FIG. 5, the choked conduit is represented by converging nozzle 520.

By focusing on mass continuity, conservation of momentum, and the Ideal Gas Law as the fundamental relationships between primary and mixed flow, equations one through six are combined, and after simple algebraic substitution and simplification, equation seven is revealed:

$$\gamma_0 = \gamma_1 = \gamma_2 \quad \text{Eq. 4}$$

$$V = M \cdot C^* \quad \text{Eq. 5}$$

$$C^* = \left[\frac{\gamma+1}{2}\right]^{\frac{\gamma+1}{2 \cdot (\gamma-1)}} \cdot \sqrt{\frac{R \cdot T^*_{tot}}{\gamma}} \quad \text{Eq. 6}$$

$$M_{2MAX} = \frac{M_1}{1 + MAR} \cdot \sqrt{\frac{T^*_{1tot}}{T^*_{2tot}}} \quad \text{Eq. 7}$$

Where $\gamma$ = heat capacity ratio
$M$ = Mach number

Interpreting equation seven, it is discovered that the mixed flow can achieve its characteristic speed ($M_{2\,max}$=1) within a continuum of positive combinations of primary flow speed, MAR, and characteristic total temperature ratio.

It should be noted that equation seven makes no guarantee that the characteristic speed will be achieved for a given ejector design. Instead, it predicts that there is sufficient momentum and internal energy in the mixed flow to achieve its characteristic speed ($M_{2max}$=1) if the mixed flow passes through its characteristic cross-sectional area.

Referring to FIG. 5, the converging nozzle 520 provides the characteristic cross-sectional area necessary to achieve the characteristic speed. The mixed flow's downstream total pressure is maximized (pumped) when passed through its characteristic cross-sectional area at sonic speed. This produces a standing shock wave at the point of maximum convergence of the nozzle 520, thereby creating sonic conditions at the inlet of the ramjet 530. This shock wave is not present in mixing ejectors.

An ejector design in which the mixed flow cannot achieve its characteristic speed ($M_{2max}$<1) cannot operate as a pump and must therefore be classified as a mixing ejector. The converging nozzle 520 used in the present invention is not present in mixing ejectors. However, even if such a nozzle was present in a mixing ejector, it would not produce the same thermodynamic effect because the mixing ejector would not produce sufficient momentum and internal energy in the mixed flow to achieve the characteristic speed necessary to produce a standing shock wave in the nozzle.

Placing a converging nozzle between a mixing ejector and a ramjet inlet would merely produce a simple Bernoulli change with no change in pressure on the downstream side of the nozzle (ramjet inlet). The boundary conditions determine the difference between pumping and simple mixing. Therefore, a mixing ejector would make no use of a converging nozzle between the ejector and the ramjet, whereas a pumping ejector gains performance from the nozzle.

Although a pumping ejector's mixed flow has momentum and internal energy sufficient to achieve its characteristic speed, the necessary mixing duct actual cross-sectional area is always larger than the characteristic cross-sectional area and is therefore mismatched. The ratios of the characteristic cross-sectional areas of the primary fluid to the mixed flow can be derived and is useful in demonstrating the cross-sectional area mismatch.

$$T_{2tot}^* \approx \frac{(T_{1tot}^* \cdot \dot{m}_1) + (T_{0tot}^* \cdot \dot{m}_0)}{\dot{m}_2} \quad \text{Eq. 8}$$

$$T_{2tot}^* \approx \frac{T_{1tot}^* + (MAR \cdot T_{0tot}^*)}{1 + MAR} \quad \text{Eq. 9}$$

$$T_{0tot}^* = T_{0tot}, \, T_{1tot}^* = T_{1tot}, \, T_{2tot}^* = T_{2tot} \quad \text{Eq. 10}$$

$$M_{2MAX}^2 = \frac{M_1^2}{1 + MAR} \cdot \frac{T_{1tot}}{T_{1tot} + (MAR \cdot T_{0tot})} \quad \text{Eq. 11}$$

$$M \approx \frac{A^* \cdot P_{tot}^*}{\dot{m} \cdot C^*} \quad \text{Eq. 12}$$

$$P_{2tot}^* \approx \frac{P_{1tot}^* + (MAR \cdot P_{0tot}^*)}{1 + MAR} \quad \text{Eq. 13}$$

$$P_{0tot}^* = P_{0tot}, \, P_{1tot}^* = P_{1tot}, \, P_{2tot}^* = P_{2tot} \quad \text{Eq. 14}$$

Equations 8 and 13 are based on accepting that the mixed flow's thermodynamic state properties can be reliably approximated by calculating the mass-weighted average of the properties of the primary and secondary fluids. Equations 10 and 14 assume isentropic conditions.

Accepting the combining of the Ideal Gas Law and mass continuity to approximate the characteristic speed reliably, equation 12 is presented.

Combining equations 7 through 10 reveals equation 11, which is a convenient alternative to equation 7.

Equation 15 defines the primary fluid to secondary fluid total pressure ratio:

$$PR_{1tot} = \frac{P_{1tot}}{P_{0tot}} \quad \text{Eq. 15}$$

Combining equations 13 through 15 produces equation 16:

$$P_{2tot} \approx P_{1tot} \cdot \left[ \frac{\frac{MAR}{PR_{1tot}} + 1}{1 + MAR} \right] \quad \text{Eq. 16}$$

Finally, combining equations 11, 12, and 16 and algebraically simplifying produces equation 17, the characteristic area ratio:

$$\frac{A_2^*}{A_1^*} = \frac{1 + MAR}{\frac{MAR}{PR_{1tot}} + 1} \quad \text{Eq. 17}$$

Interpreting equation 17, it is discovered that the mixed flow's characteristic cross-sectional area ratio is simply a function of MAR and $PR_{1\,tot}$. $A_1^*$ is equivalent to the cross-sectional area of the primary-fluid nozzle throat. There are conceptual limitations to values for the area ratio.

The first limitation is that $PR_{1\,tot}$ must always be greater than unity to permit primary fluid flow ($PR_{1\,tot}>1$) The second limitation is that MAR must always be greater than zero to conform to the purpose of an ejector (MAR>0). Given these limitations and equation 17, the calculated area ratio must always be greater than unity ($A_2^*/A_1^*>1$).

Furthermore, assuming an ideal gas, the absolute pressure ratio is approximately 1.8 ($PR_{1\,tot}=1.8$) for the primary-fluid to reach sonic conditions in the nozzle throat. Employing this ideal pressure ratio and equation 17, the area ratio approaches the pressure ratio asymptotically with increasing positive MAR. Therefore, the area ratio of equation 17 must always be less than the pressure ratio for an ideal gas. However, to satisfy the requirements for a pumping ejector as described by equations 7 and 11, the ideal-gas solutions of equation 17 must be further restricted.

Maximizing the ramjet's internal air total pressure is the primary factor in ramjet performance. A pumping ejector maximizes its utility for ramjet propulsion by maximizing the pumping effect on internal air total pressure. Equation 12 applied to the mixed plane reveals that pressure is maximized for a fixed flow area when the momentum is maximized.

A pumping ejector maximizes mixed flow momentum when the primary flow momentum is maximized, as shown by equation 2. Primary flow momentum is maximized for a fixed mass flow when velocity is maximized, and velocity in turn is maximized when the primary fluid nozzle exit is maximized.

As explained above, a fully expanded nozzle maximizes velocity when the exit pressure is expanded to match the secondary fluid pressure (P at $A_1=P_0$). A useful pumping ejector for propulsion must employ a fully expanded primary-fluid nozzle.

Oates presents the ratio of the exit area to the characteristic area for a nozzle with ideal gas and isentropic flow:

$$\frac{A_1}{A_1^*} = \frac{1}{M_1} \cdot \left[ \frac{2 + (\gamma - 1) \cdot M_1^2}{\gamma - 1} \right]^{\frac{\gamma+1}{2(\gamma-1)}} \quad \text{Eq. 18}$$

Numerically iterating equation 18 with ideal-gas heat capacity ratio ($\gamma \approx 1.4$) reveals that the nozzle area ratio is greater than the minimum pressure ratio ($PR_{1\,to\,t}=1.8$, note: $P/P_T \div =1/PR_{1\,tot}$) with which to fully expand to the secondary fluid pressure (P at $A_1=P_0$). This result with equation 17 reveals another fundamental relationship, that the actual exit area of the primary nozzle of a pumping ejector is greater than the mixed flow's characteristic area, and is therefore mismatched ($A_1>A_2^*$).

A pumping ejector must have a mixing duct actual flow area greater than the primary nozzle exit area to satisfy the geometric definition of an ejector ($A_2>A_1$). This geometric requirement causes the mixing duct's actual flow area to be greater than the characteristic area ($A_2>A_2^*$). Therefore a pumping ejector's mixed plane must be followed by a subsonic converging nozzle (520) with a throat area ($A_3$) equal to the characteristic area ($A_2>A_2^*=A_3$).

Moving from the topic of thermodynamics to fluid dynamics, Keenan does not propose a physical mechanism for the mixing or pumping actions of ejectors. (see also Keenan, et al, "An Investigation of Ejector Design by Analysis and Experiment," *Journal of Applied Mechanics*, September 1950, pp. 299-309)

However, Der resurrected the concept of the crossflow velocity component of the equations of motion as the theoretical foundation for ejector entrainment. (see Der, Joe, "Improved Methods of Characterizing Ejector Pumping Performance," Journal of Propulsion and Power, Vol. 7, No. 3, May-June 1991, pp. 412-419, American Institute of Aeronautics and Astronautics, Inc., Washington, D.C. 20024 USA.) Der shows that maximized crossflow occurs when the free mixing layer is maximized in dimensions and attached to the mixing duct wall via high pressure ratios and with an under-expanded primary-fluid nozzle. A pumping ejector for propulsion should maximize the shear zone between the primary and secondary fluids and maximize the pressure ratio as found by Keenan (1950) and later by Der (1991) and within the limits and requirements explained above.

There are distinct ejector configurations which reflect sequential generations of performance. The ejector primary-fluid nozzle design is key for describing each generation.

Figure 6A:
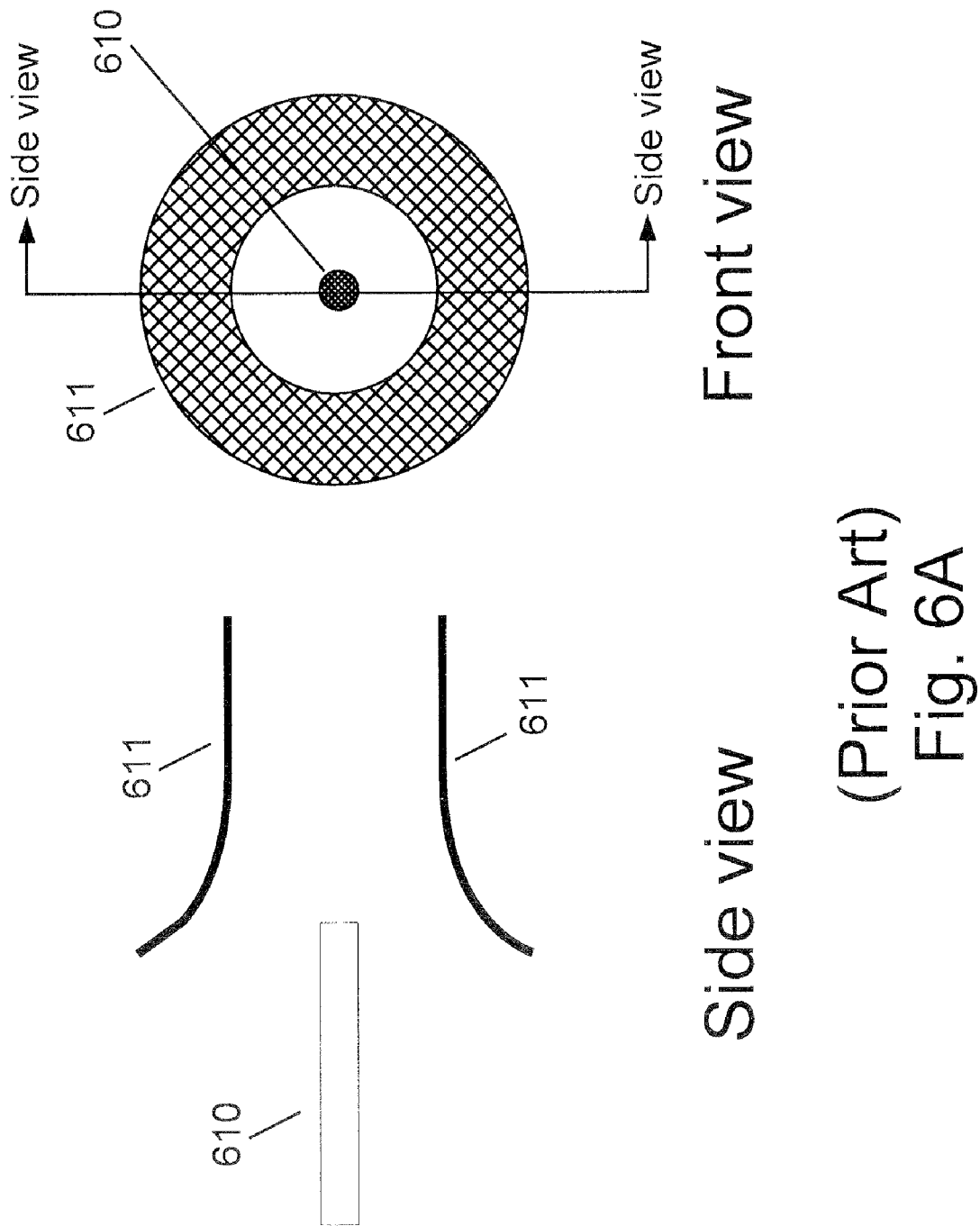
FIG. 6A represents the basic elements of a first-generation ejector in accordance with the prior art.

FIG. 6A illustrates a first-generation ejector nozzle as described by Keenan (1942) and which has a single orifice of circular cross-section 610. In this configuration, the crossflow is limited to the outer surface of the single spray cone.

Figure 6B:
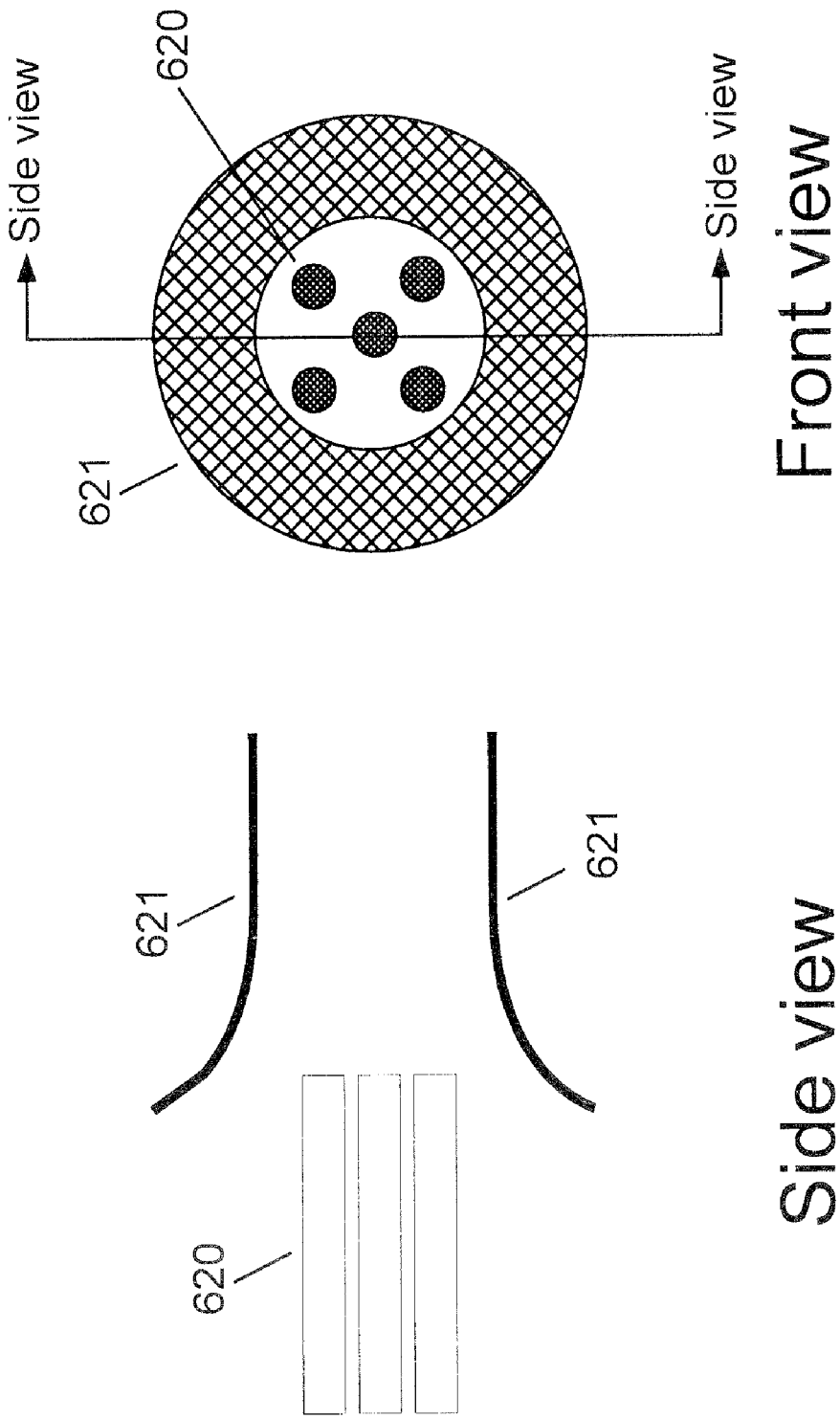
FIG. 6B represents the basic elements of a second-generation ejector in accordance with the prior art.

FIG. 6B illustrates a second-generation ejector nozzle as described by Schmitt and is an array of orifices of circular cross-section 620. The crossflow is again limited to the outer surface of the spray cone but with multiplicity. (see H. Schmitt, "Diversity of Jet Pumps and Ejector Techniques," Paper A4, pp. A4-35 thru A4-49, proceedings of the $2^{nd}$ Symposium on Jet Pumps & Ejectors and Gas Lift Techniques, Mar. 24-26, 1975, held at Churchill College, Cambridge England, published by BHRA Fluid Engineering in Cranfield, Bedford, England, circa 1975.)

Figure 6C:
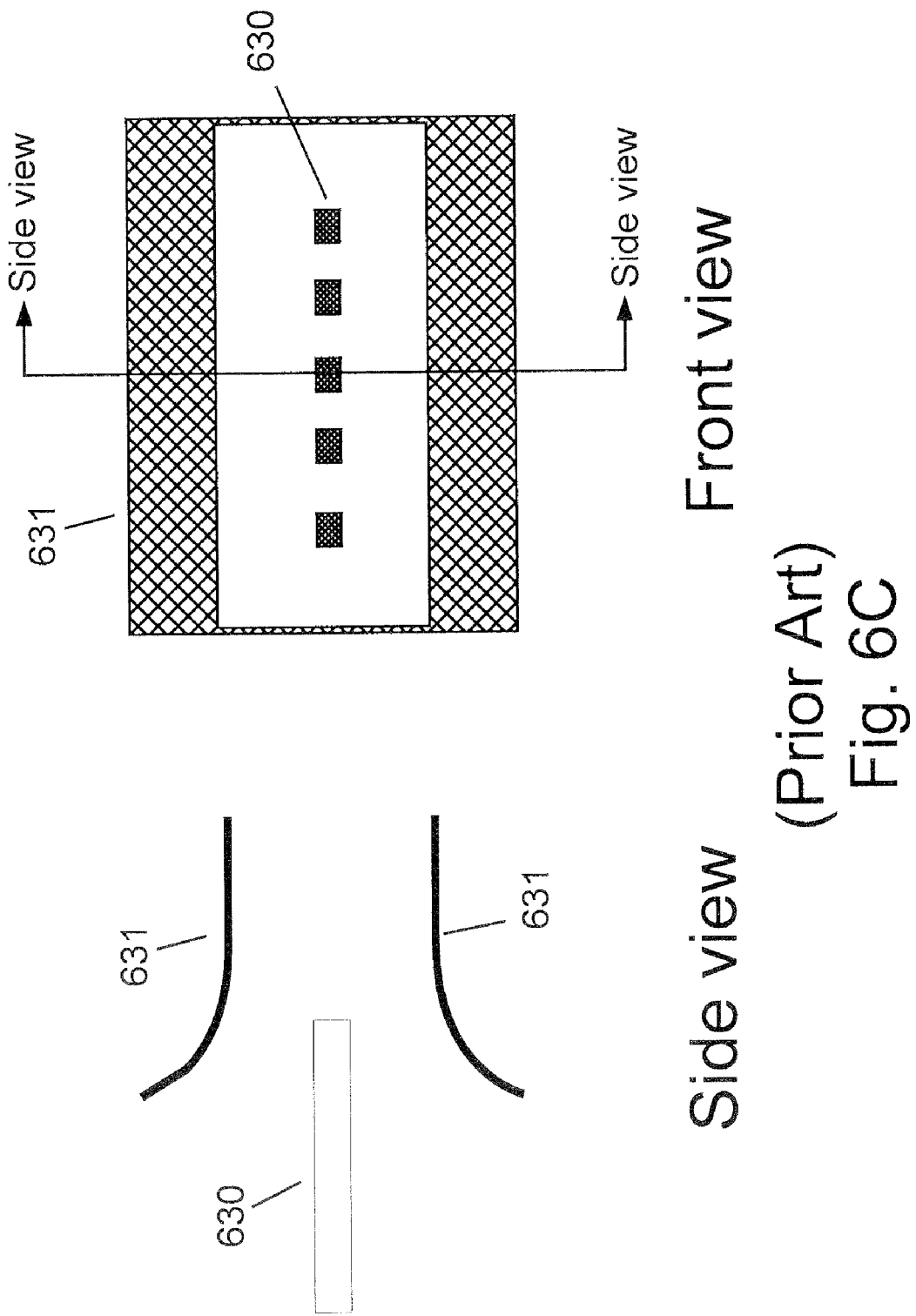
FIG. 6C represents the basic elements of a third-generation ejector in accordance with the prior art.

FIG. 6C illustrates a third-generation ejector nozzle, also described by Schmitt, which alters the orifice cross-section from circular to rectilinear 630, thus increasing the area of the spray's outer surface and with multiplicity.

Figure 6D:
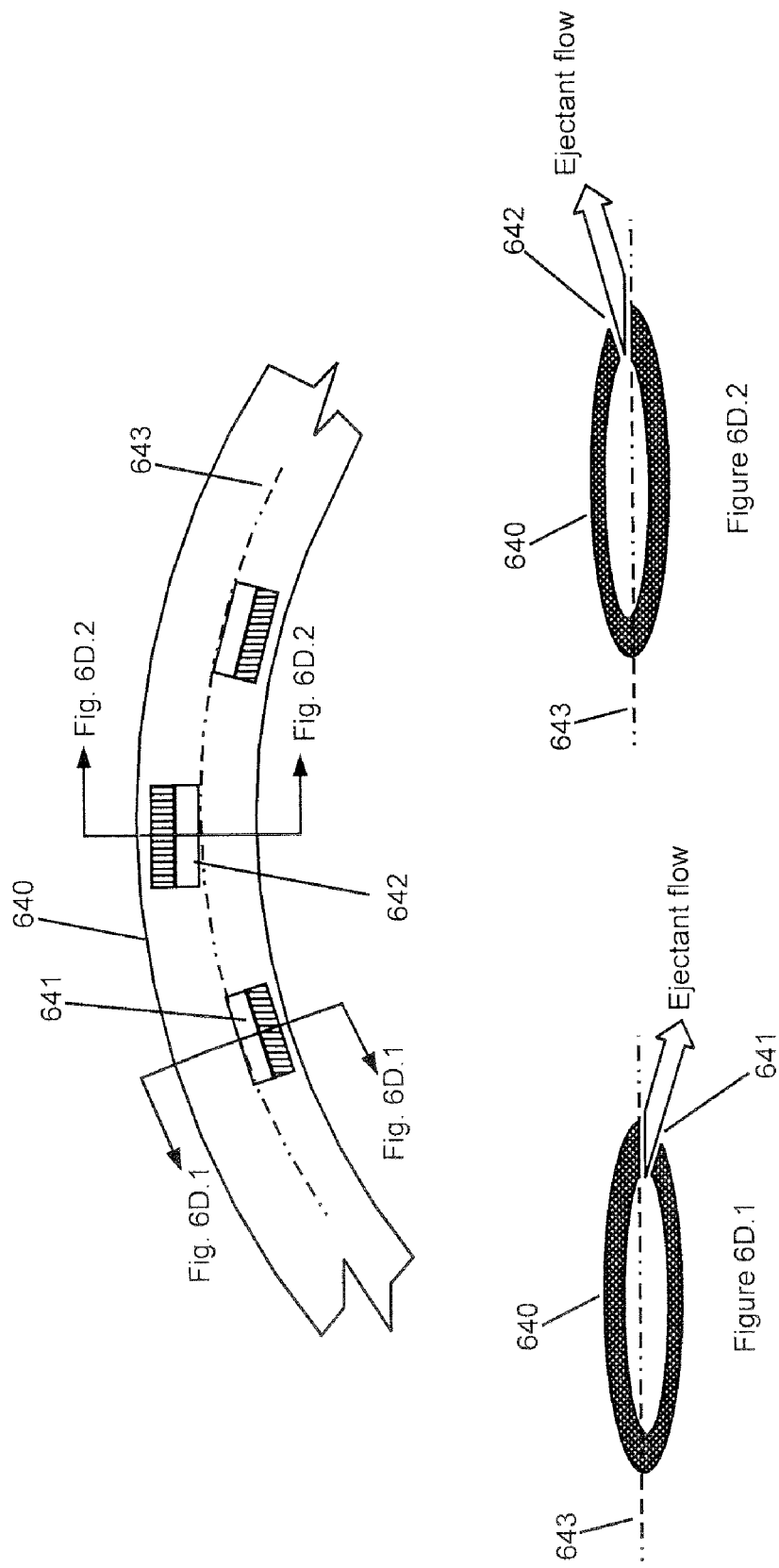
FIG. 6D represents the basic elements of a fourth-generation ejector in accordance with the prior art.

FIG. 6D illustrates a fourth-generation ejector nozzle as described by Bendot and which has multiple rectilinear orifices 641, 642 with abutting lateral ends in the trailing edge of an annular nozzle 640. Further, Bendot alters the geometry of the orifices so that the spray cone of each is directed inclined to the longitudinal axis 643. The set of orifices direct the spray in alternating directions (alternating inward and outward radial directions) and diverging the orifice flow vectors at the nozzle exit as shown in FIG. 6D.1 versus 6D.2. Bendot specifies that this configuration provides "hypermixing" performance of the ejector. (see Bendot, et al, "Low Cost Hypermixing Ejector Ramjet Program," US DoD AD Number: ADA016430 Corporate Author: Marquardt Co, Van Nuys, Calif. USA, Report Date: Jun. 1, 1975.)

A hypermixing ejector as defined by Bendot performs complete mixing in the mixing duct in a fraction of the longitudinal length required by simple ejectors. The Bendot ejector nozzle achieves hypermixing through the interaction of the spray of adjacent orifices to create longitudinal helical vortices (a.k.a. streamwise vortices). These helical streamwise vortices of adjacent interacting orifice sprays increase the Der crossflow dramatically over noninteracting sprays. The greater the interaction of these helical streamwise vortices, the greater is the Der crossflow and the greater the performance of the ejector. A pumping ejector for propulsion could minimize mixing length by employing hypermixing within the limits and requirements discussed above.

An early example of a hypermixer was the Aerospace Research Laboratories' (ARL, an organization of the US Air Force) proof-of-concept captured-jet prototype tested by the Marquardt Company under the control of Joseph Bendot. The ARL ejector ramjet had as its stated objective "more rapid mixing with the ramjet engine flow." This prototype incorporated a fuel ejector as a replacement for the conventional fuel injector. The fuel ejector employed an innovative nozzle design with complex geometry which produced complex fluid dynamic phenomena that forced complete mixing in half the distance/time of a simple fuel injector. The ejector was positioned downstream of the ramjet inlet and upstream of the ramjet diffuser.

The ramjet's inlet duct was lengthened to accommodate the ejector and provide for mixing. The ejector's mixing duct exit has the same cross-section as the ramjet diffuser inlet and is co-planar. No other modifications of the Fono ramjet were made. This prototype was designated an "ejector ramjet." The thermodynamics of the ARL ejector ramjet remained unchanged from the Fono model with the exception of the addition of the ejected fuel's momentum and superheated temperature which act to improve the apparent efficiency of the ramjet's components.

The ARL ejector ramjet prototype employed an ejector of total pressure ratio 20 and a primary nozzle that was fully expanded to sea level pressure. However, the ARL, ejector ramjet engine does not achieve sufficient momentum and internal energy to make the characteristic speed possible ($M_{2max}$=0.34). It also does not employ a subsonic converging nozzle with a throat area equal to the characteristic area downstream of the ejector mixing plane. As such, the ARL engine does not have a pumping ejector and therefore cannot generate thrust statically. These failings make the ARL engine impractical for static operation.

Later designs by Bendot (as disclosed in U.S. Pat. Nos. 5,946,904 and 6,786,040) have an ejector which is substantially the same as that described by Bendot in 1975.

FIG. 7A is a cross sectional view of an annular primary fluid nozzle 703 in accordance with the preferred embodiment of the present invention. FIG. 7A shows fluid flow through both upper and lower abutting orifices 701, 702, which combine to produce hypermixing. Hypermixing is improved with increasing helical streamwise vortices. The ARL hypermixing primary-fluid nozzle described above generated helical streamwise vortices by directing abutting orifice flows to interact in shear. However, the ARL geometry delays the interaction due to divergence of the orifice flow vectors at the nozzle exit.

FIG. 7A illustrates the improved ejector hypermixing nozzle of the present invention which uses converging orifice flow at the nozzle exit as shown in FIG. 7A.1 versus 7A.2. To achieve convergence, the hypermixing nozzle inclines the geometry of the orifices so that the spray cone of each is directed convergently relative to the longitudinal axis 704.

Figure 7B:
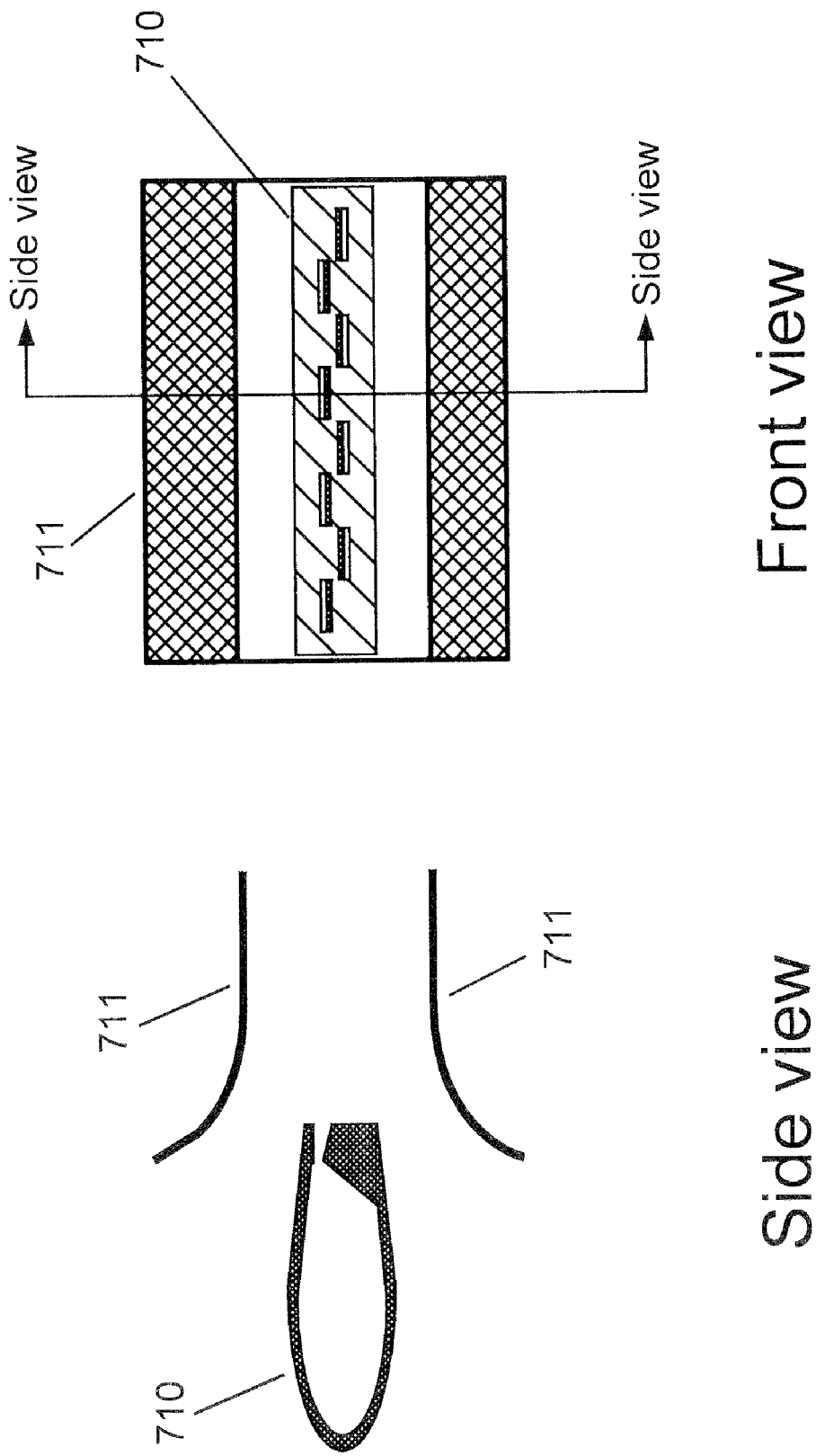
FIG. 7B shows the improved ejector with single strut nozzle suitable for rectilinear configurations in accordance with an alternate embodiment of the present invention.

FIG. 7B illustrates an ejector with a mixing duct 711 of rectilinear transverse cross-section having a linear strut nozzle body 710 to include a trailing-edge lateral array of abutting rectilinear orifices producing convergent hypermixing flow in accordance with an alternate embodiment of the present invention.

Figure 7C:
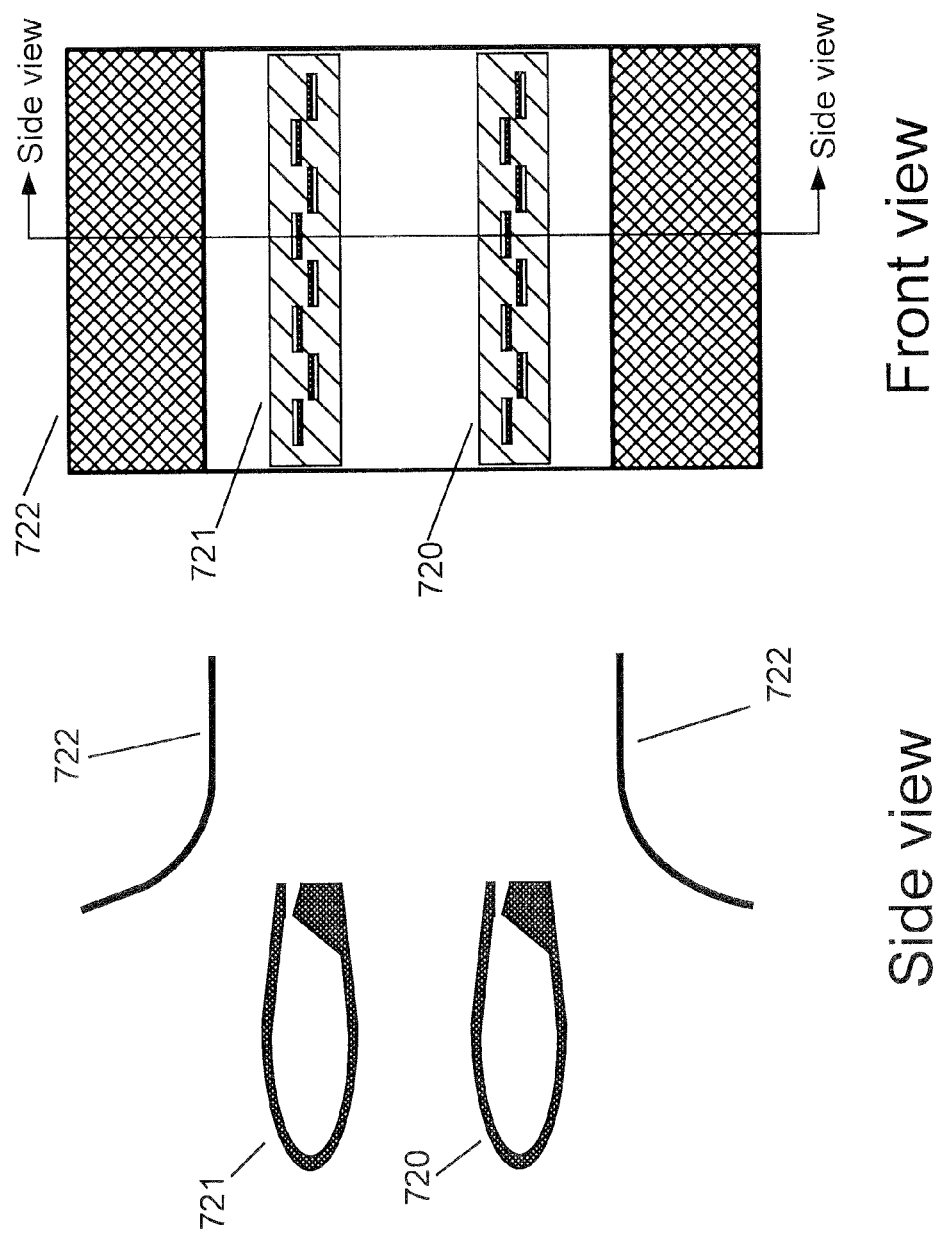
FIG. 7C shows the improved ejector with multiple strut nozzles suitable for rectilinear configurations in accordance with an alternate embodiment of the present invention.

FIG. 7C illustrates an ejector with a mixing duct 722 of rectilinear transverse cross-section having multiple strut nozzle bodies 720, 721, which may be employed in parallel and at the same longitudinal location of the ejector mixing duct in accordance with an alternate embodiment of the present invention. The struts are sized and positioned so that the atmosphere can pass between the struts in sufficient and equal fluidic rates and with minimum fluidic disturbance.

Figure 7D:
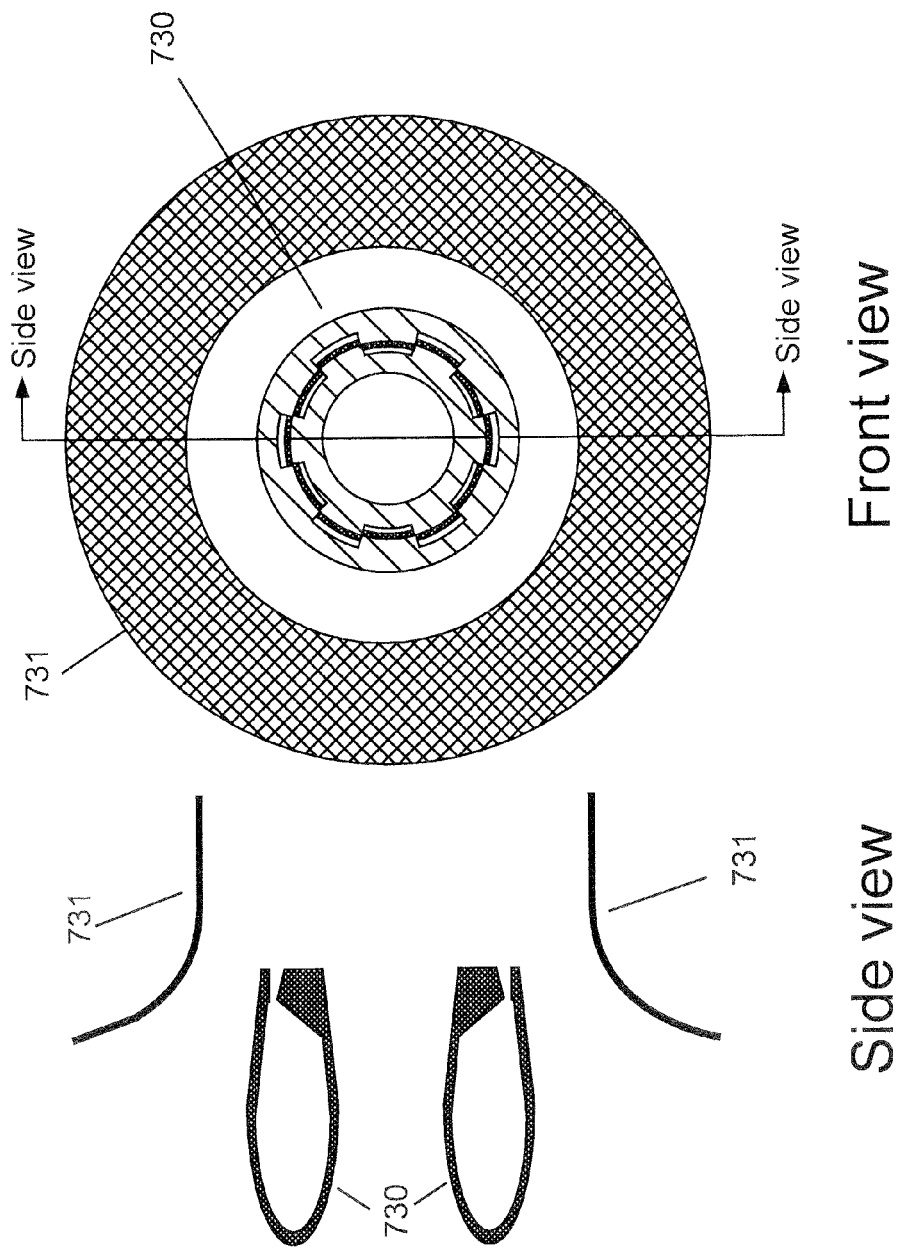
FIG. 7D shows the improved ejector with single annular nozzle suitable for circular configurations in accordance with the preferred embodiment of the present invention.

FIG. 7D illustrates an ejector with a mixing duct 731 of circular transverse cross-section having a single annular nozzle body 730 to include a trailing-edge radial array of abutting rectilinear orifices producing convergent hypermixing flow in accordance with an alternate embodiment of the present invention.

Figure 7E:
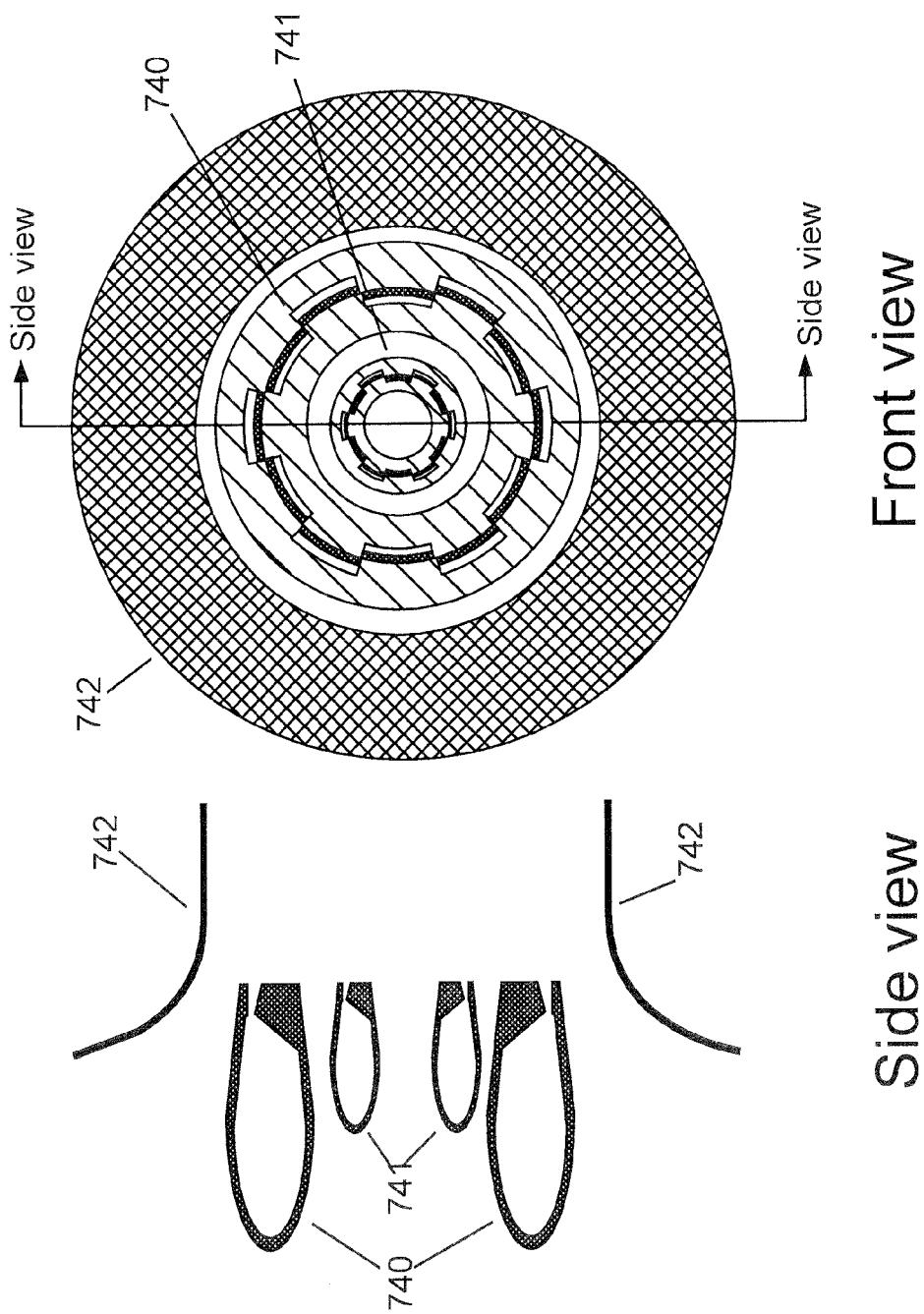
FIG. 7E shows the improved ejector with multiple annular nozzles suitable for circular configurations in accordance with an alternate embodiment of the present invention.

FIG. 7E illustrates an ejector with a mixing duct 742 of circular transverse cross-section having multiple annular nozzle bodies 740, 741 as may be employed concentrically and at the same longitudinal location of the ejector mixing duct in accordance with an alternate embodiment of the present invention. Again, the annulae are sized and positioned so that the atmosphere may pass through in sufficient fluidic rates and with minimum fluidic disturbance.

In addition to promoting efficient hypermixing, the ejector nozzle used in the present invention also avoids the issue of duct resonance, which is a common weakness in many prior art ramjet designs.

Keenan (1942 and 1950) described ejector performance solely with the physics of one dimensional inviscid fluid dynamics. Neglected were the physical phenomena of acoustics. Abdel-Fattah showed that duct resonance can be a major factor in ejector performance. Specifically, the generation of standing acoustic waves in the mixing duct (duct resonance) can greatly increase secondary fluid entrainment for a given pressure ratio. (see Abdel-Fattah, et al, "Duct Resonance and Its Effects on the Performance of High-Pressure Ratio Axisymmetric Ejectors," *AIAA Journal, Vol.* 26, No. 7, July 1988, pp. 791-798, American Institute of Aeronautics and Astronautics, Inc., Washington, D.C. 20024 USA.) However, Abdel-Fattah also shows that duct resonance can be lost spontaneously if any of the three controlling factors are changed. These factors are 1) stagnation pressure ratio, 2) ejector primary-fluid nozzle geometry, and 3) ejector mixing-duct geometry.

Figure 8:
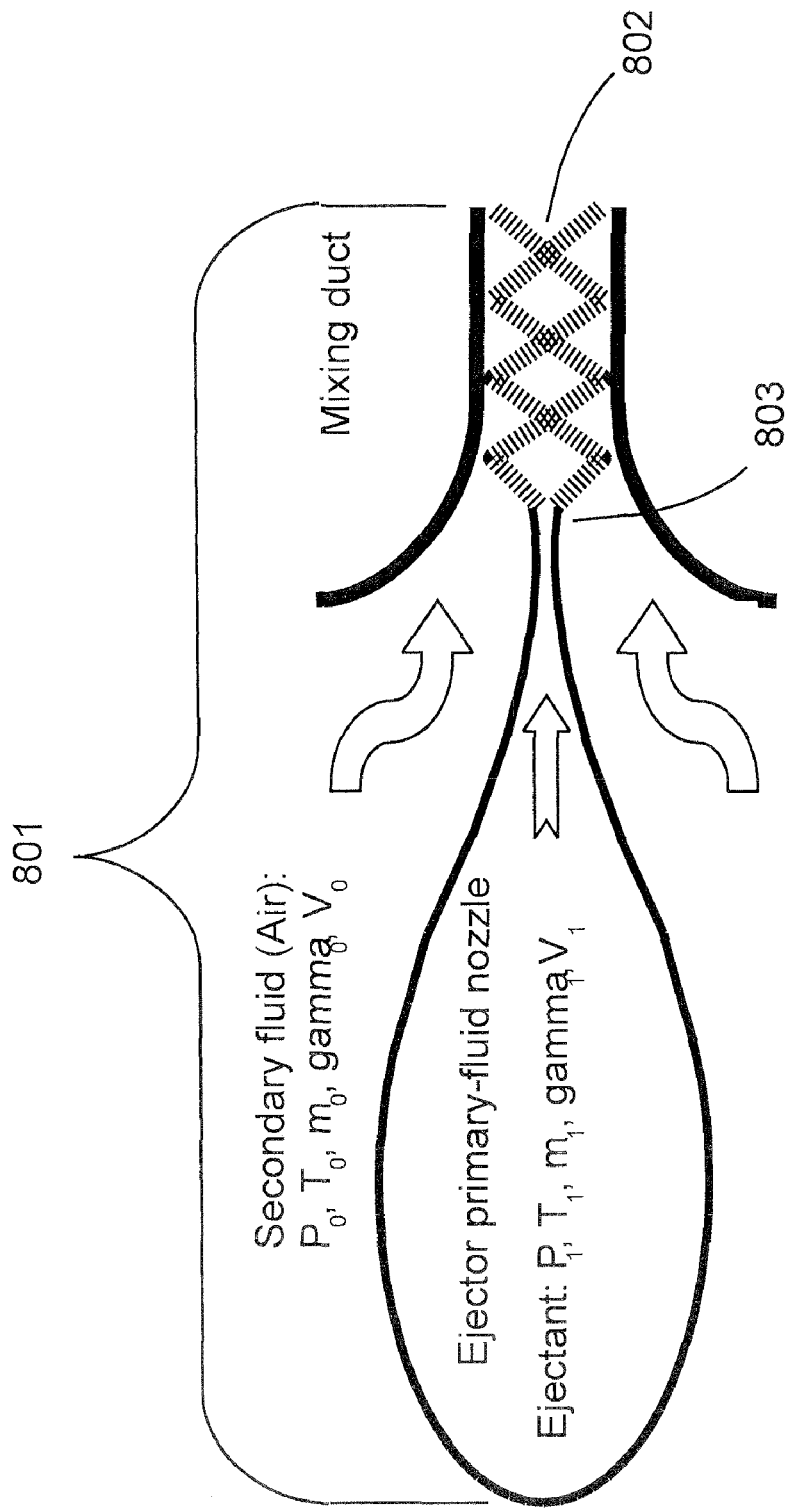
FIG. 8 illustrates an ejector with under-expanded primary nozzle flow creating oblique shock waves in the mixing duct for the purpose of explanation.

Keenan and Abdel-Fattah both present photographic evidence that under-expanded primary nozzle flow creates oblique shock waves in the mixing duct. FIG. 8 illustrates a first-generation ejector 801 with an underexpanded primary nozzle 803 which creates oblique shock waves 802 in the mixing duct. These shock waves are standing acoustic waves which can be made resonant. Therefore, the level of under-expansion of primary nozzle flow is a key factor in causing duct resonance. A pumping ejector for propulsion should avoid duct resonance by employing a fully-expanded primary-fluid nozzle.

The earliest relevant ejector ramjet was disclosed in U.S. Pat. No. 3,093,962 to Gluhareff, which was later recharacterized by Gluhareff in 1978. (see G8-2 Technical Manual, published by EMG Engineering Co., 18518 So. Broadway, Gardena, Calif. 90248 USA, circa 1978.)

The Gluhareff ejector ramjet consists of a complex multi-stage ejector mated to a Fono ramjet at the entrance to the ramjet diffuser. The ejector's mixing duct exit has the same cross-section as the ramjet diffuser inlet and is co-planar. The Gluhareff ejector is based upon duct resonance as evidenced by the explicit statement that the ejector stages are "sonically tuned" to permit useful operation. Further, the primary nozzle is clearly an under-expanded type that maximizes exit pressure ratio, which maximizes the strength of oblique shock waves in the mixing duct of the first ejector stage. The dynamics of the second and third stages are unknown as their static pressure ratios fall far below the limits of theory presented by Keenan and Abdel-Fattah.

Gluhareff presents photographic evidence of the engine type in operation statically and dynamically. However, no known working applications exist today. The market failure of this design is likely due to the unstable operation of an ejector based upon duct resonance. Abdel-Fattah showed that duct resonance can be lost spontaneously if any of the three controlling factors mentioned above are changed. The Gluhareff ejector ramjet has fixed geometry but not fixed stagnation pressure ratio.

Three factors in determining stagnation pressure ratio are uncontrolled by the Gluhareff engine and therefore prevent stable thrust production. The first factor is varying fuel pressure due to employing gaseous propane stored in the liquid phase and at natural saturated vapor pressure. Time-varying changes to the boiling liquefied gas's enthalpy causes time-varying temperature changes and therefore vapor pressure changes and consequently stagnation pressure ratio changes. The second factor is variation of the secondary fluid's initial atmospheric altitude and consequently stagnation pressure ratio. The third factor is variation of the secondary fluid's initial velocity as a consequence of the propulsive effects and consequently the stagnation pressure ratio. These ever-present factors make the Gluhareff engine unstable.

Furthermore, the Gluhareff engine does not achieving sufficient momentum and internal energy to make the characteristic speed possible ($M_{2max}$=0.06). It also does not employ a fully expanded primary fluid nozzle or a subsonic converging nozzle with a throat area equal to the characteristic area downstream of the ejector mixing plane. The Gluhareff engine does not have a pumping ejector when not in resonance and therefore cannot generate thrust statically when not in resonance. In other words, the Gluhareff engine requires duct resonance to generate thrust, but as soon as the engine begins to move, it loses duct resonance and therefore thrust. These failings make the Gluhareff engine impractical.

Bulman claimed that improved ejector mixing could be accomplished by time-varying changes in primary fluid jet direction. U.S. Pat. No. 5,205,119 issued to Bulman describes the primary fluid flow as generating hammer and expansion shock waves in the mixing duct which suggests an under-expanded primary nozzle. Through fluid-dynamic controls, Bulman oscillates the direction of the primary jet so that resonance with the mixing duct is achieved. Furthermore, Bulman labels the interaction of the primary and secondary fluids as "wave dynamic pressure exchange." This type of interaction is unconventional and supporting scientific references are not cited for evaluation.

A design by Brooks dubbed a "Hybrijet" is poorly documented and claims a statically-operating ejector ramjet. (see Hybrijet model HJ-2-25 marketing brochure, published by Hybrijet Engines, PO Box 715, Cornville, Ariz. 86325 USA, circa 1995.) Historical documentation shows that it has a striking resemblance to the Gluhareff engine. Photographs reveal a simple ejector as described by Keenan (1942) employing gaseous propane at natural saturated vapor pressures (pressure ratio 10) and a single- or ice, under-expanded ejector primary-fluid nozzle. The Brooks engine eliminates the Gluhareff multi-stage sonically tuned ejector and substitutes a simple long-duct ejector. As explained above, such an engine must operate on the principle of duct resonance and must suffer the same difficulties as the Gluhareff engine and therefore is unstable and impractical.

UK Patent No. 2,404,952 issued to Rowe claimed a statically-operating ejector ramjet. Rowe's design has striking similarity to Brooks 1995. Rowe states that the ejector's maximum primary fluid (fuel) pressure is 20 bar. The primary fluid nozzle is specified as converging-diverging (expanding)

to achieve the desired stoichiometry and specifies the primary nozzle area ratio as 3. However, the primary fluid nozzle geometry and boundary conditions specified results in significant under-expansion at sea level. As shown above this engine must operate on the principle of duct resonance and must suffer the same difficulties as the Gluhareff engine.

Figure 9:
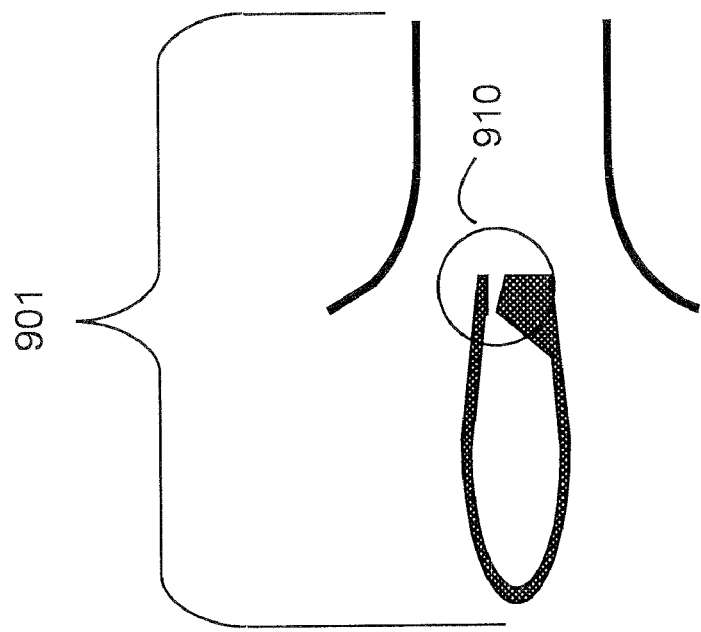
FIG. 9 illustrates the difference between a fully-expanding primary-fluid nozzle versus a non-fully-expanding primary-fluid nozzle for the purpose of explanation.
Figure 9:
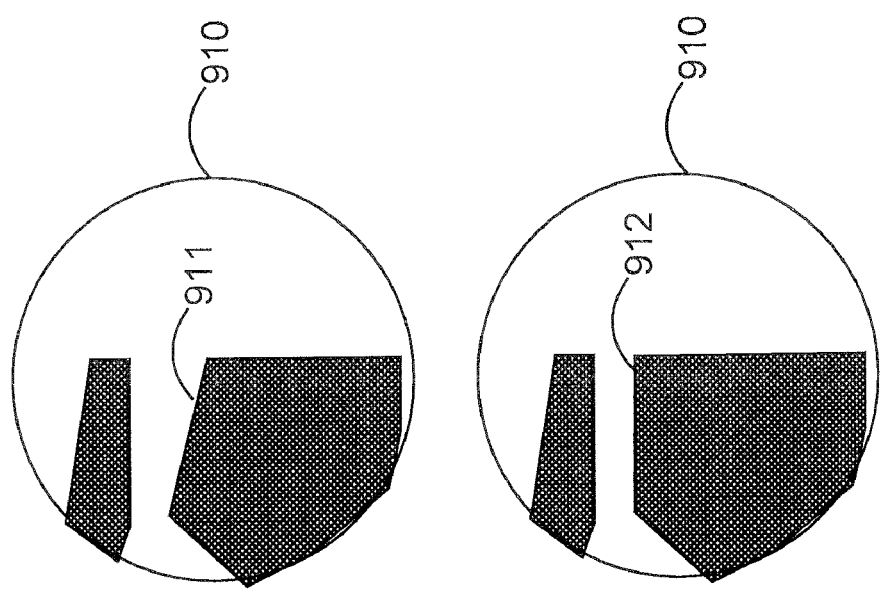

Because the pumping ejector of the present invention employs a fully-expanded primary-fluid nozzle it avoids duct resonance problems of the Gluhareff model and similar designs. FIG. 9 illustrates an ejector 901 of the present invention with magnified views of the primary nozzle orifice 910 having a diverging cross-sectional flow area 911 thus expanding the primary fluid and to be compared visually to a constant cross-sectional flow area 912 which does not expand the primary fluid.

Figure 10:
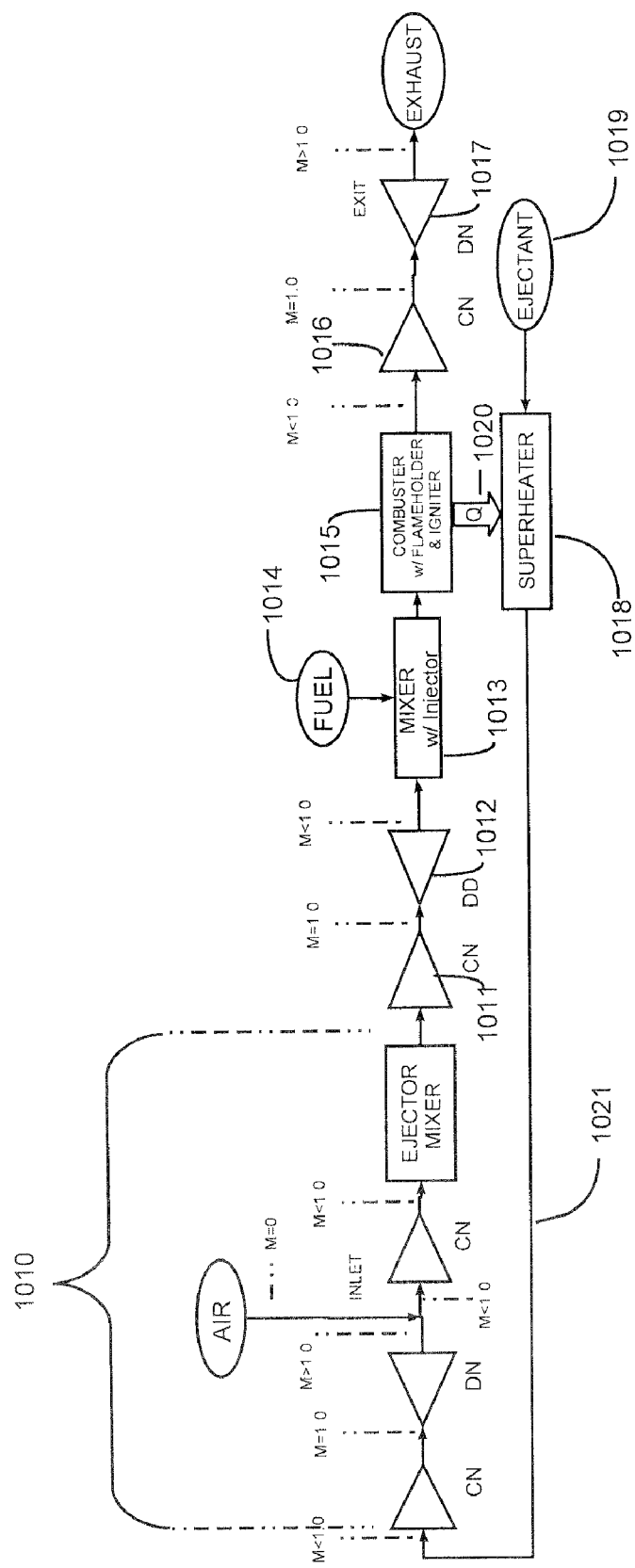
FIG. 10 shows a block diagram of an ejector ramjet in accordance with a preferred embodiment of the present invention.

FIG. 10 shows a block diagram of an ejector ramjet in accordance with a preferred embodiment of the present invention. The present invention comprises a statically-starting and operating ejector ramjet with a base configuration that mates a pumping ejector to a ramjet engine. FIG. 10 shows a bi-propellant embodiment of the present invention (explained in detail below).

The invention employs a pumping ejector 1010 of either constant-pressure or constant-area mixing duct or a combination of geometry with a fully-expanding, supersonic primary fluid nozzle. This permits primary-fluid flow rates necessary for maximum designed dynamic thrust at the design atmospheric conditions. The geometry of the primary fluid nozzle can be of first, second, third or fourth generation as described above. As explained above, a fourth-generation nozzle provides the maximum ejector performance with the phenomenon of hypermixing.

The primary fluid is of a high pressure ratio and high temperature ratio with sufficient momentum and internal energy to entrain atmosphere into the ramjet inlet. This achieves a MAR sufficient to permit the mixed flow to achieve its characteristic speed. The primary fluid may be a reactant, inert, or a mixture (described in more detail below).

The pumping ejector 1010 communicates with a subsonic converging nozzle 1011 that can vary its throat cross sectional area for a wide range of flow rates, including the mixed flow's characteristic cross sectional area at minimum static power. The nozzle 1011 then communicates with a subsonic diverging diffuser 1012 that compresses the mixed flow sufficient for static start and operation.

The diffuser 1012 communicates with a subsonic reactant mixing duct 1013 optionally equipped with a fluid reactant injector 1014 sufficient to permit the complete mixing of the reactants and atmosphere at the desired stoichiometry. The mixer leads 1013 to a combustion duct 1015 equipped with a flame holder and igniter sufficient to permit substantially complete combustion of the reactive mixture.

The combustor 1015 communicates with a subsonic converging nozzle 1016 that expands the combustion products to its characteristic speed at the throat. This is the combustion products' characteristic cross-sectional area and can vary for a wide range of flow rates including the flow at minimum static power. The subsonic converging nozzle 1016 leads to a supersonic diverging nozzle 1017 which fully expands the combustion products to the atmospheric pressure, thereby producing engine thrust.

As explained above, the primary fluid is of high temperature ratio. In a preferred embodiment of the present invention, a regenerative superheater 1018 is employed to achieve this ratio, with a reservoir of primary fluid in temperature equilibrium with its low temperature-ratio surroundings. The superheater 1018 is energized by thermal energy 1020 from the engine combustor 1015 and redirects its superheated primary-fluid flow into the engine upstream of the combustor via line 1021, wherein it is fed into the pump ejector 1010. This is known as a regenerative superheater.

In one embodiment of the present invention, the superheater is internal to the combustor so that hot combustion-product flow contacts the conductive surface of the superheater, thus exchanging thermal energy from the combustion products to the primary fluid flowing through the internal passages of the superheater.

In an alternate embodiment, the superheater is external to the combustor so that the conductive outer wall of the engine case is in contact with the conductive surface of the superheater, thus exchanging thermal energy from the combustion products to the primary fluid.

For either the internal or external superheater design, the temperature of the primary fluid at maximum intended mass flow rate is kept below the lesser of its autoignition level (when the primary fluid is a reactant) or its Raleigh-flow choking limit (when the primary fluid is inert). Recall that the Raleigh-flow choking limit describes invicid fluid flow in a constant-area tube with heat addition which reaches its maximum mass flow rate for a given pressure ratio when the temperature of the fluid reaches a critical value. This choking limit for an ideal gas has the predicted phenomenon that further heat addition does not cause any greater mass flow but does increase the temperature of the fluid. The superheater design also limits the minimum temperature of the primary fluid to above its phase-change temperature so as to maintain a gaseous state in all components downstream.

The superheater can be of fixed geometry with performance time-varying with time-varying engine power as represented by the block diagram of FIG. 10.

Figure 11:
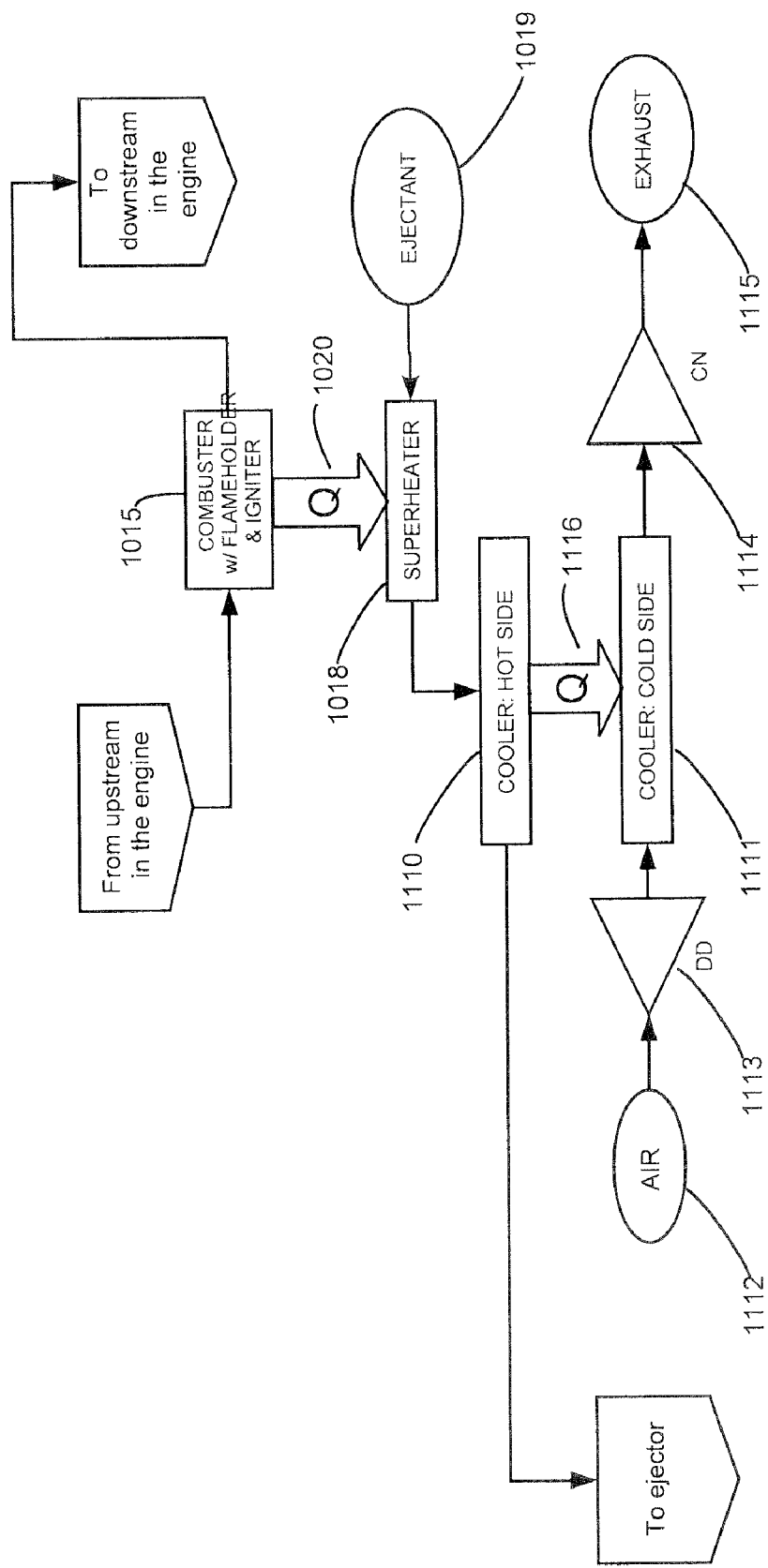
FIG. 11 shows a block diagram of a superheater of fixed geometry coupled with a variable-geometry cooler transferring thermal energy to the atmosphere in accordance with an alternate embodiment of the present invention

FIG. 11 shows a block diagram representing a superheater of fixed geometry in accordance with an alternate embodiment of the present invention. This superheater has excess performance at all engine power levels coupled with a variable-geometry cooler transferring thermal energy to the atmosphere and installed downstream of the superheater and upstream of the primary fluid nozzle, with performance optimized with time-varying engine power.

Specifically, thermal energy 1020 from the engine combustor 1015 flows to the fixed-geometry superheater 1018 excessivly energizing ejectant flowing from a reservoir 1019 through the superheater and into the fixed-geometry hot side of the cooler 1110 and then to the engine's ejector.

Ejectant flowing through the hot side of the cooler 1110 loses thermal energy 1116 to the cold side of the cooler 1111 according to the temperature differential between the cold and hot sides. To complete the cooling cycle free air 1112 enters a subsonic diffuser 1113 with a variable-geometry diverging-wall inlet and then communicating with the cold side of the cooler 1111 and then passing through a subsonic nozzle 1114 with a variable-geometry converging-wall exit as exhaust 1115. The temperature differential between the hot and cold sides of the cooler is optimized by the time-varying geometry of the cooler's cold-side air inlet and exit.

Figure 12:
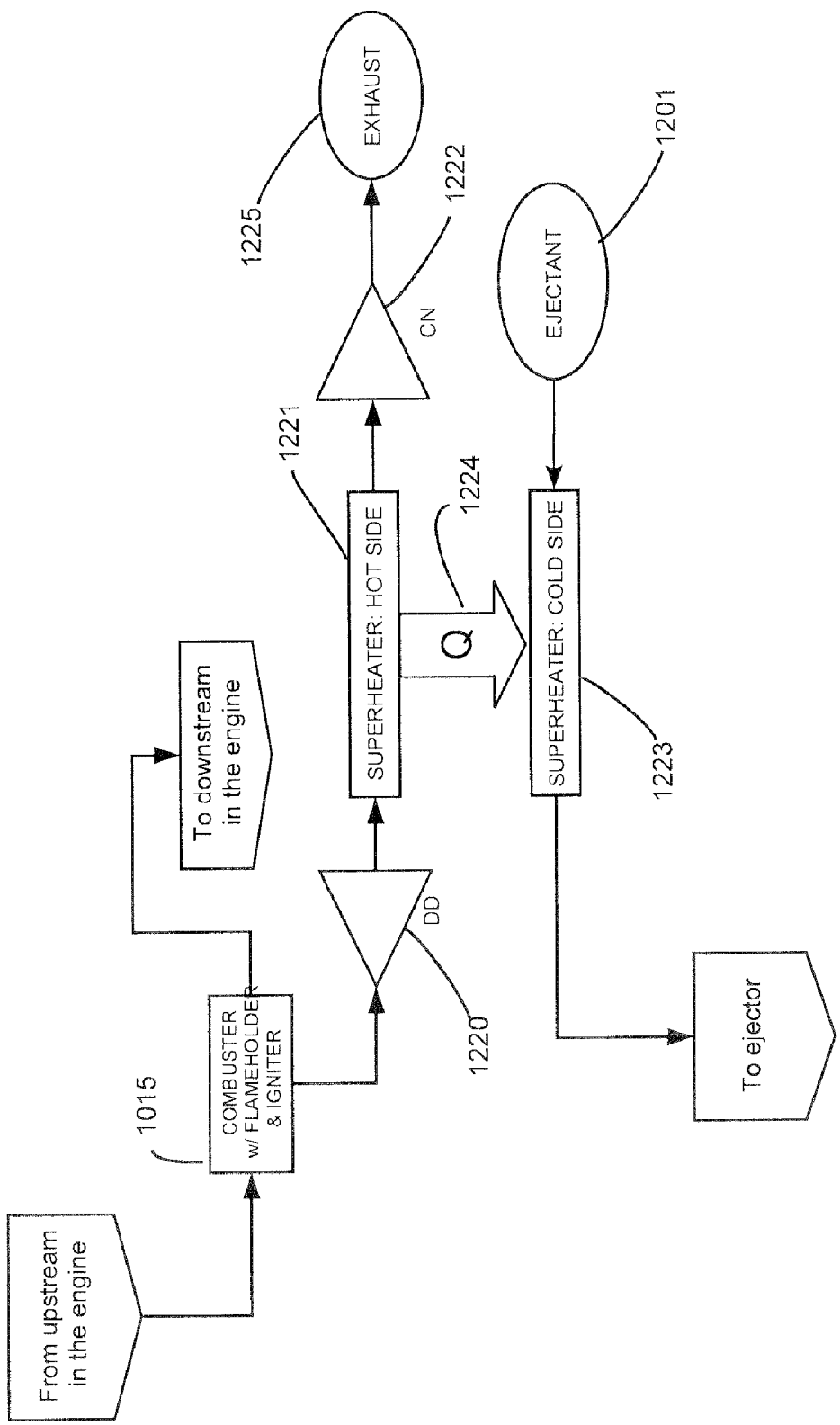
FIG. 12 shows a block diagram of a superheater of variable geometry in accordance with an alternate embodiment of the present invention.

FIG. 12 shows a block diagram representing a superheater of variable geometry with performance optimized with time-varying engine power in an alternate embodiment of the present invention. Specifically, a small portion of hot combustion gas is bled from the combustor 1015 and flowed through a subsonic diffuser 1220 with a variable-geometry diverging-wall inlet and then communicating with the hot side of the superheater 1221 permitting the flow of thermal energy 1224 to the cold side of the superheater.

The combustion gas is then passed from the hot side of the superheater 1221 through a subsonic nozzle 1222 with a variable-geometry converging-wall exit as exhaust 1225. To complete the heating cycle, ejectant from a reservoir 1201 flows through the cold-side of the superheater 1223 and then to the engine's ejector.

The ejectant gains thermal energy when flowing through the cold side of the superheater according to the temperature differential between the hot and cold sides. The temperature differential between hot and cold sides of the superheater is optimized by the time-varying geometry of the superheater's hot-side combustion gas inlet and exit.

The superheater designs described above can also be applied to uses other than heating a fluid that is redirected to an ejector. In an alternate application, the fluid heated by the superheater can be redirected upstream to the ramjet inlet to prevent ice formation.

The present invention has two variations of the base configuration, comprising monopropellant and bi-propellant embodiments. Each embodiment has thermodynamic and operational advantages over the other depending upon the intended statically-operating application. These embodiments are intended for a terrestrial application with standard air.

The embodiment shown in FIG. 10 is an example of a bi-propellant configuration. The bi-propellant configuration has an ejectant 1019 that is an inert propellant, and the subsonic reactant mixing duct 1013 is equipped with a reactant injector 1014 sufficient to permit the complete mixing of the reactants and atmosphere at the desired stoichiometry.

In this embodiment, the reactant flow is preferred to be controlled so that the stoichiometric equivalence is unity or less in the combustion chamber:

$$E = \frac{f}{f_{stoi}} \qquad \text{Eq. 19}$$

Where f=the fuel/air ratio
the $f_{stoi}$=the fuel/air ratio at maximum thermal energy formation Only the bi-propellant embodiment can achieve stoichiometric equivalence less than unity in static operation. The primary advantage of this configuration is the ability in static and dynamic operation to limit the maximum combustion temperature to below a critical value such as structural material upper limits. The prime disadvantage of the bi-propellant embodiment is the added complexity and mass of two propellant storage, distribution, and control systems.

Figure 13:
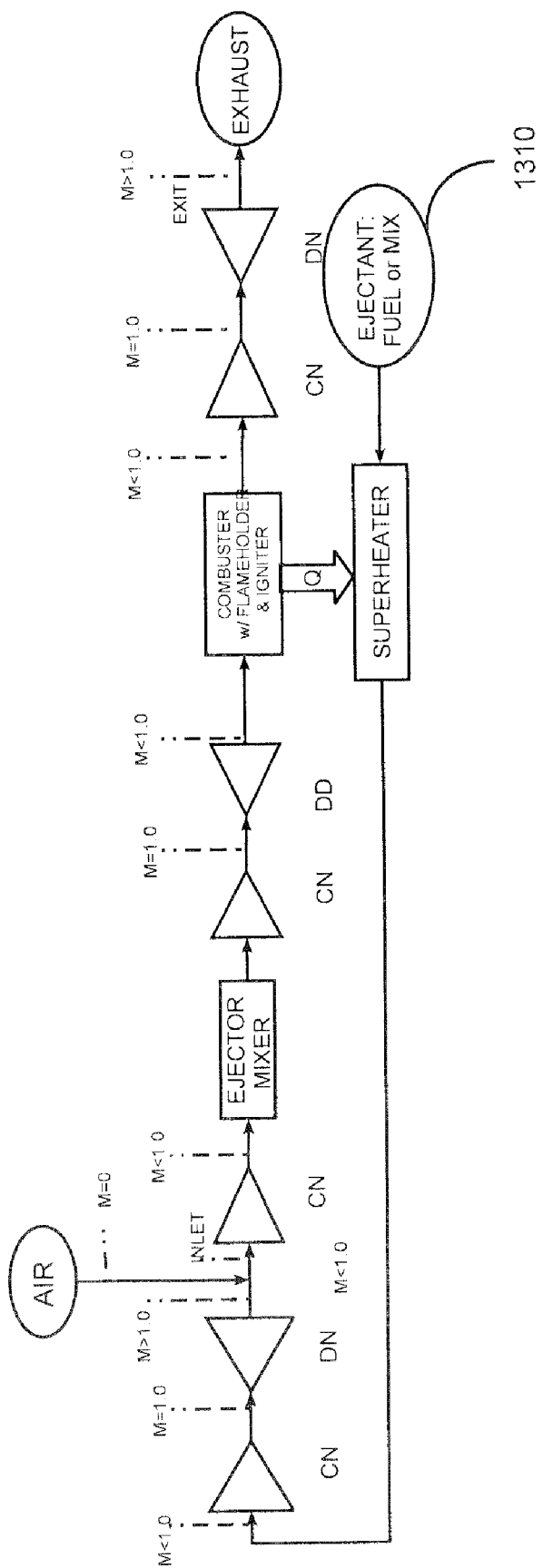
FIG. 13 shows a mono-propellant ejector ramjet in accordance with an alternate embodiment of the present invention.

FIG. 13 shows a mono-propellant ejector ramjet in accordance with an alternate embodiment of the present invention. The overall configuration is similar to that of the bi-propellant embodiment shown in FIG. 10. However, the mono-propellant embodiment dispenses with the subsonic reactant mixing duct and reactant injector (1013, 1014 in FIG. 10) and instead delivers the single reactive propellant as the ejectant 1310. For this configuration there is a continuum of propellant choice. At one end of the continuum is purely reactive propellant and the other end is reactive propellant diluted with an inert propellant.

A mono-propellant configuration with an ejectant made of purely reactive propellant is limited in stoichiometry during static operation. The mono-propellant configuration of the present invention achieves a MAR of less than three. In this configuration, with a purely reactive ejectant, the MAR is also the air-fuel ratio. Such extremely low air-fuel ratios result in a static-operation stoichiometric equivalence above unity for all petroleum fuels, simple alcohols, simple hydrocarbons, and molecular hydrogen. The primary advantage of this configuration is the simplicity and mass of a single propellant storage, distribution and control system. The main disadvantage in static operation is the much higher propellant consumption rate associated with stoichiometric equivalence above unity.

To overcome the stoichiometric equivalence limitations of the purely reactive propellant ejectant, the ejectant can be a mixture of inert and reactive propellants. In this configuration the Ejectant Mass Ratio (EMR, eq.21) of the inert propellant to reactive propellant (fuel) alters the stoichiometry of the ejector mixed flow:

$$f = \frac{\dot{m}_f}{\dot{m}_0} \qquad \text{Eq. 20}$$

$$EMR = \frac{\dot{m}_i}{\dot{m}_f} \qquad \text{Eq. 21}$$

Where $\dot{m}_f$=the mass flow rate of fuel
$\dot{m}_i$=the mass flow rate of inert propellant
Combining equations 3, 20, and 21 gives the combustor fuel-air ratio in terms of MAR and EMR:

$$f = \frac{1}{MAR \cdot (EMR + 1)} \qquad \text{Eq. 22}$$

One specification for the mixed propellant ejectant is aqueous methyl alcohol ($H_2O + CH_3OH$) which provides a completely soluble mixture. Aqueous methyl alcohol with an $f_{Stoi}$ of 0.155 and a MAR of 2.0 requires an EMR equal or greater than 2.225 to achieve equivalence equal or less than unity. This mixed propellant ejectant achieves equivalence equal to or less than unity and is within flammability limits for the combustor mixed flow. It provides the advantages of both the bi-propellant and purely reactive mono-propellant configurations without their disadvantages. The primary disadvantage of this embodiment is the limitation for components of the mixed propellant ejectant to be miscible and be flammable in the combustor at equivalence equal or less than unity.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A statically starting and operating ramjet engine system, comprising:
   (a) a ramjet engine;
   (b) a pumping ejector coupled to the ramjet engine upstream of the ramjet inlet, wherein the pumping ejector ejects a primary fluid into the ramjet inlet to entrain a secondary fluid and create a mixed flow with sufficient momentum and internal energy to achieve characteristic speed; and (c) a subsonic converging nozzle in fluid communication between the pumping ejector and ramjet inlet, wherein the converging nozzle provides a characteristic cross section necessary for said mixed flow to achieve characteristic speed as it moves through the nozzle, thereby producing a standing shock wave at the point of maximum convergence of the nozzle and creating sonic conditions at the inlet of the ramjet engine.

2. The ramjet engine system according to claim 1, wherein the ramjet engine system is a bipropellant system, wherein said primary fluid constitutes a first propellant that enters the ramjet engine at the inlet via said pumping ejector, and wherein a second propellant enters the ramjet engine via a mixing duct located between the ramjet inlet and combustion chamber.

3. The ramjet engine system according to claim 2, wherein the first propellant is inert and the second propellant is a reactive fuel.

4. The ramjet engine system according to claim 2, wherein fuel/air stoichiometric equivalence in the combustion chamber is unity or less.

5. The ramjet engine system according to claim 1, wherein the ramjet engine system is a monopropellant system, wherein said primary fluid includes a reactive propellant that enters the ramjet engine at the inlet via said pumping ejector.

6. The ramjet engine system according to claim 5, wherein said primary fluid consists of a purely reactive propellant.

7. The ramjet engine system according to claim 5, wherein said primary fluid comprises a mixture of a reactive propellant diluted with an inert propellant.

8. The ramjet engine system according to claim 7, wherein the primary fluid is aqueous methyl alcohol.

9. The ramjet engine system according to claim 8, wherein the Ejectant Mass Ratio of the inert propellant to reactive propellant is equal or greater than 2.225, producing a fuel/air stoichiometric equivalence in the combustion chamber of unity or less.

10. The ramjet engine system according to claim 1, further comprising a regenerative superheater that transfers thermal energy from the ramjet engine combustion chamber to said primary fluid drawn from a reservoir, wherein superheated primary fluid is redirected upstream into the pumping ejector.

11. The ramjet engine system according to claim 10, wherein the superheater is internal to the ramjet engine combustion chamber.

12. The ramjet engine system according to claim 10, wherein the superheater is external to the ramjet engine combustion chamber.

13. The ramjet engine system according to claim 1, wherein the pumping ejector further comprises a fully-expanded primary-fluid nozzle, wherein exit speed of the primary fluid is supersonic and exit static pressure of the primary fluid is equal to secondary fluid pressure.

14. The ramjet engine system according to claim 1, wherein the pumping ejector further comprises a primary-fluid nozzle with alternating upper and lower abutting orifices that are geometrically inclined to produce convergent pray cones to produce helical hypermixing of the primary and secondary fluids.

15. A method for statically starting and operating a ramjet engine, the method comprising the steps of:

(a) ejecting a primary fluid into the ramjet inlet to entrain a secondary fluid and create a mixed flow with sufficient momentum and internal energy to achieve characteristic speed; and (c) passing said mixed flow through a subsonic converging nozzle in fluid communication between the pumping ejector and ramjet inlet, wherein the converging nozzle provides a characteristic cross section necessary for said mixed flow to achieve characteristic speed as it moves through the nozzle, thereby producing a standing shock wave at the point of maximum convergence of the nozzle and creating sonic conditions at the inlet of the ramjet engine.

* * * * *

UNITED STATES PATENT AND TRADEMARK OFFICE
CERTIFICATE OF CORRECTION

| | | |
|---|---|---|
| PATENT NO. | : 7,954,329 B2 | Page 1 of 1 |
| APPLICATION NO. | : 12/024573 | |
| DATED | : June 7, 2011 | |
| INVENTOR(S) | : Fabio G. Grossi | |

It is certified that error appears in the above-identified patent and that said Letters Patent is hereby corrected as shown below:

In the Specification:

In column 6, Equation 7, please replace the subscript "1tor" with --1tot-- such that Equation 7 appears as follows:

$$M_{2MAX} = \frac{M_1}{1+MAR} \cdot \sqrt{\frac{T^*_{1tot}}{T^*_{2tot}}} \quad \text{Eq. 7}$$

In column 12, line 56, please replace "single-or ice" with --single-orifice--.

Signed and Sealed this
Eighteenth Day of October, 2011

David J. Kappos
*Director of the United States Patent and Trademark Office*